US012675836B2

(12) United States Patent
Bhatnagar et al.

(10) Patent No.: US 12,675,836 B2
(45) Date of Patent: Jul. 7, 2026

(54) DYNAMIC PERFORMANCE AND POWER ADJUSTMENT FOR SPLIT XR APPLICATIONS

(71) Applicant: QUALCOMM Incorporated, San Diego, CA (US)

(72) Inventors: Arpit Bhatnagar, Bengaluru (IN); Abhishek Ranka, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 18/473,138

(22) Filed: Sep. 22, 2023

(65) Prior Publication Data

US 2025/0104177 A1 Mar. 27, 2025

(51) Int. Cl.
G06T 1/20 (2006.01)

(52) U.S. Cl.
CPC ...................................... G06T 1/20 (2013.01)

(58) Field of Classification Search
CPC .. A63F 13/30; G06T 1/20; G06N 3/08; G06F 3/011; G06F 9/5027; H04N 21/4122; H04N 21/4126; H04N 21/42653; H04N 21/4307; H04N 21/442; H04N 21/4436; H04N 21/4621; H04N 21/466; H04N 21/6587; H04N 21/816
USPC .......................................................... 345/501
See application file for complete search history.

(56) References Cited

U.S. PATENT DOCUMENTS

| | | | |
|---|---|---|---|
| 11,700,402 B1 * | 7/2023 | Dimitrov | H04L 65/612 |
| | | | 725/144 |
| 2016/0042488 A1 * | 2/2016 | Campbell | G09G 5/363 |
| | | | 345/506 |

| | | | |
|---|---|---|---|
| 2018/0039317 A1 | 2/2018 | Riguer | |
| 2018/0098083 A1 | 4/2018 | Mcallister | |
| 2019/0141374 A1 | 5/2019 | McAuley et al. | |
| 2019/0164518 A1 | 5/2019 | Dimitrov | |
| 2020/0058152 A1 | 2/2020 | Zhang et al. | |
| 2024/0135485 A1 * | 4/2024 | He | G06T 1/20 |
| 2024/0152440 A1 * | 5/2024 | Osborn | G06N 3/09 |
| 2024/0236167 A1 | 7/2024 | Hourihane | |

FOREIGN PATENT DOCUMENTS

WO 2022186929 A1 9/2022

OTHER PUBLICATIONS

International Search Report and Written Opinion—PCT/US2024/042097—ISA/EPO—Feb. 28, 2025.
International Search Report and Written Opinion—PCT/US2024/042097—ISA/EPO—Mar. 17, 2025.

* cited by examiner

*Primary Examiner* — Jacinta M Crawford
(74) *Attorney, Agent, or Firm* — Procopio, Cory, Hargreaves & Savitch LLP

(57) ABSTRACT

Aspects presented herein relate to methods and devices for frame processing including an apparatus, e.g., client or server. The apparatus may estimate a set of frame processing times for at least one first frame in a set of frames. The apparatus may also detect a set of actual frame processing times for the at least one first frame in the set of frames. The apparatus may also output, based on the set of estimated frame processing times and the set of actual frame processing times, an indication to adjust a set of second frame processing times for at least one second frame in the set of frames, where the at least one second frame is subsequent to the at least one first frame in the set of frames.

27 Claims, 12 Drawing Sheets

200

Predicted Pose 722

Predicted Render 724

Predicted Encode 726

Predicted NW streaming/
transmission 728

Predicted Decode 730

Predicted Vsync 732

Actual Pose 752

Actual Render 754

Actual Encode 756

Actual NW streaming/
transmission 758

Actual Decode 760

Actual Vsync 762

Estimate a set of frame processing times for at least one first frame in a set of frames

1106

Detect a set of actual frame processing times for the at least one first frame in the set of frames

1108

Output an indication to adjust a set of second frame processing times for at least one second frame in the set of frames

1110

1100

DYNAMIC PERFORMANCE AND POWER ADJUSTMENT FOR SPLIT XR APPLICATIONS

TECHNICAL FIELD

The present disclosure relates generally to processing systems and, more particularly, to one or more techniques for split extended reality (XR) applications.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a client device, a server, a display processing unit (DPU), a graphics processing unit (GPU), or any apparatus that may perform display processing. The apparatus may obtain an indication of a set of frames prior to an estimation of a set of frame processing times. The apparatus may also train a machine learning (ML) model for a set of frames prior to an estimation of a set of frame processing times. Additionally, the apparatus may estimate a set of frame processing times for at least one first frame in a set of frames. The apparatus may also detect a set of actual frame processing times for the at least one first frame in the set of frames. The apparatus may also output, based on the set of estimated frame processing times and the set of actual frame processing times, an indication to adjust a set of second frame processing times for at least one second frame in the set of frames, where the at least one second frame is subsequent to the at least one first frame in the set of frames. Moreover, the apparatus may adjust, based on the set of estimated frame processing times and the set of actual frame processing times, the set of second frame processing times for the at least one second frame.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
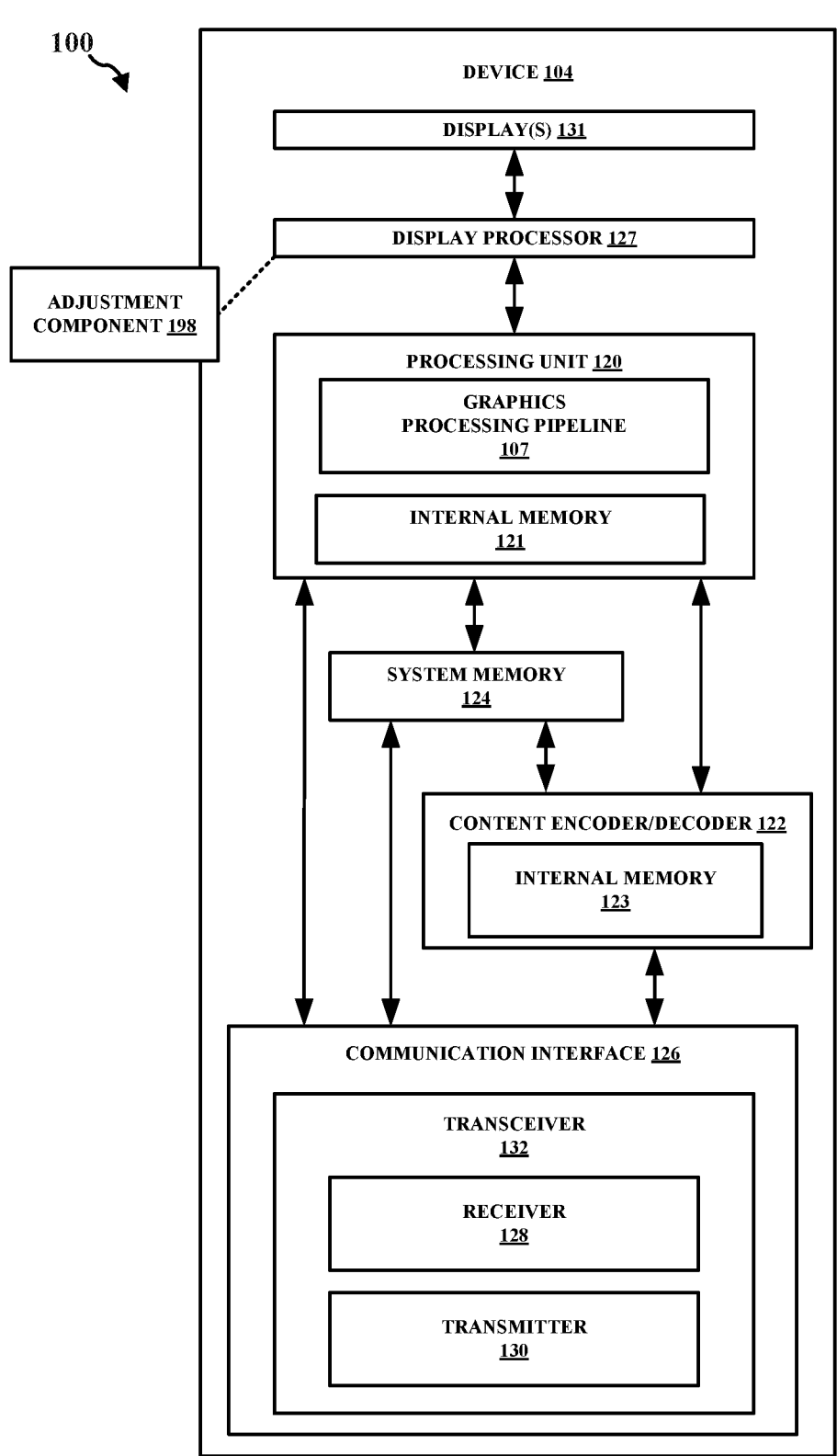
FIG. 1 is a block diagram that illustrates an example content generation system.

In some aspects of split rendering, once a head pose is transmitted from a client device (e.g., glasses) to a server (e.g., a phone) a new scene may be rendered, encoded, decoded, and then displayed (e.g., displayed at the client). However, the frame that is ultimately displayed on the client device (e.g., glasses) may be delayed by a certain amount, such as one vertical synchronization (VSync) old (e.g., the frame was rendered/encoded one VSync time unit prior). Similarly, certain types of data (e.g., camera data) may be encoded, transmitted, and decoded from the client device (e.g., glasses) to the server (e.g., a phone) in a delayed fashion. However, based on a number of different factors (e.g., the scene complexity, system workload, etc.), certain frames (e.g., frames) may be ready for display at an earlier time than is specified by VSync timing. In some aspects, these frames that would normally be ready may be delayed due to the occurrence of different frame issues (e.g., frame repeat or frame miss). In these types of scenarios, motion-to-render-to-photon (M2R2P) latencies and user experience may be less than optimal. That is, there may be sub-optimal display performance due to fixed performance settings or configurations. For instance, there may be sub-optimal end-to-end performance in the split rendering pipeline due to fixed performance settings for multiple components in the pipeline from the server (e.g., phone) to the client device (e.g., glasses). Aspects of the present disclosure may improve or mitigate power and/or performance issues across the split rendering pipeline. For instance, aspects presented herein may adjust performance and content quality in order to mitigate a number of display/frame issues (e.g., frame loss/repeat and/or M2R2P latencies). Additionally, aspects of the present disclosure may improve an overall user experience in the split rendering pipeline. In order to do so, aspects of the present disclosure may dynamically adjust the performance and/or the content quality in the split rendering pipeline. For example, aspects presented herein may perform dynamic performance adjustments and/or dynamic content quality adjustments. That is, aspects presented herein may improve an overall user experience in a split rendering pipeline (e.g., improve M2R2P latencies and/or frame loss/repeat issues) and reduce power and/or thermal issues by utilizing dynamic performance adjustments and/or dynamic content quality adjustments.

Aspects of the present disclosure may include a number of benefits or advantages. For instance, aspects presented herein may improve an overall user experience for split rendering. That is, aspects presented herein may utilize a dynamic performance adjustment that may help to reduce frame repeats/misses and improve overall latency. Also, aspects presented herein may utilize a dynamic performance adjustment that may help to improve content quality and/or user experience. Aspects presented herein may also adjust or reduce the amount of power utilized for split rendering. For example, aspects presented herein may utilize a dynamic performance adjustment that may help to reduce performance of multiple subsystem whenever possible. Also, aspects presented herein may utilize a dynamic performance adjustment that may help to reduce power consumption and thermal power.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include an adjustment component 198 configured to obtain an indication of a set of frames prior to an estimation of a set of frame processing times. The adjustment component 198 may also be configured to train a machine learning (ML) model for a set of frames prior to an estimation of a set of frame processing times. The adjustment component 198 may also be configured to estimate a set of frame processing times for at least one first frame in a set of frames. The adjustment component 198 may also be configured to detect a set of actual frame processing times for the at least one first frame in the set of frames. The adjustment component 198 may also be configured to output, based on the set of estimated frame processing times and the set of actual frame processing times, an indication to adjust a set of second frame processing times for at least one second frame in the set of frames, where the at least one second frame is subsequent to the at least one first frame in the set of frames. The adjustment component 198 may also be configured to adjust, based on the set of estimated frame processing times and the set of actual frame processing times, the set of second frame processing times for the at least one second frame. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
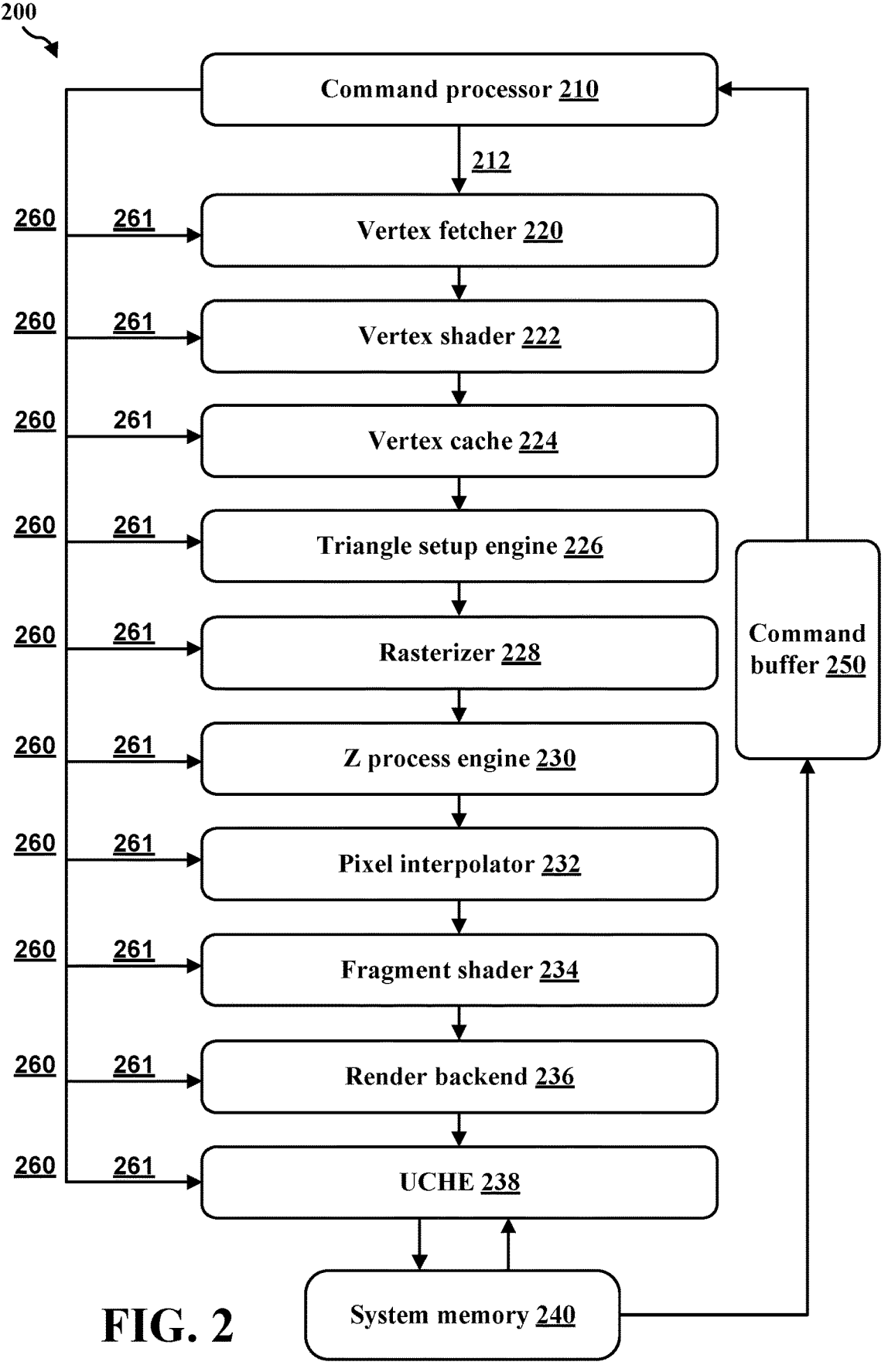
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1. GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
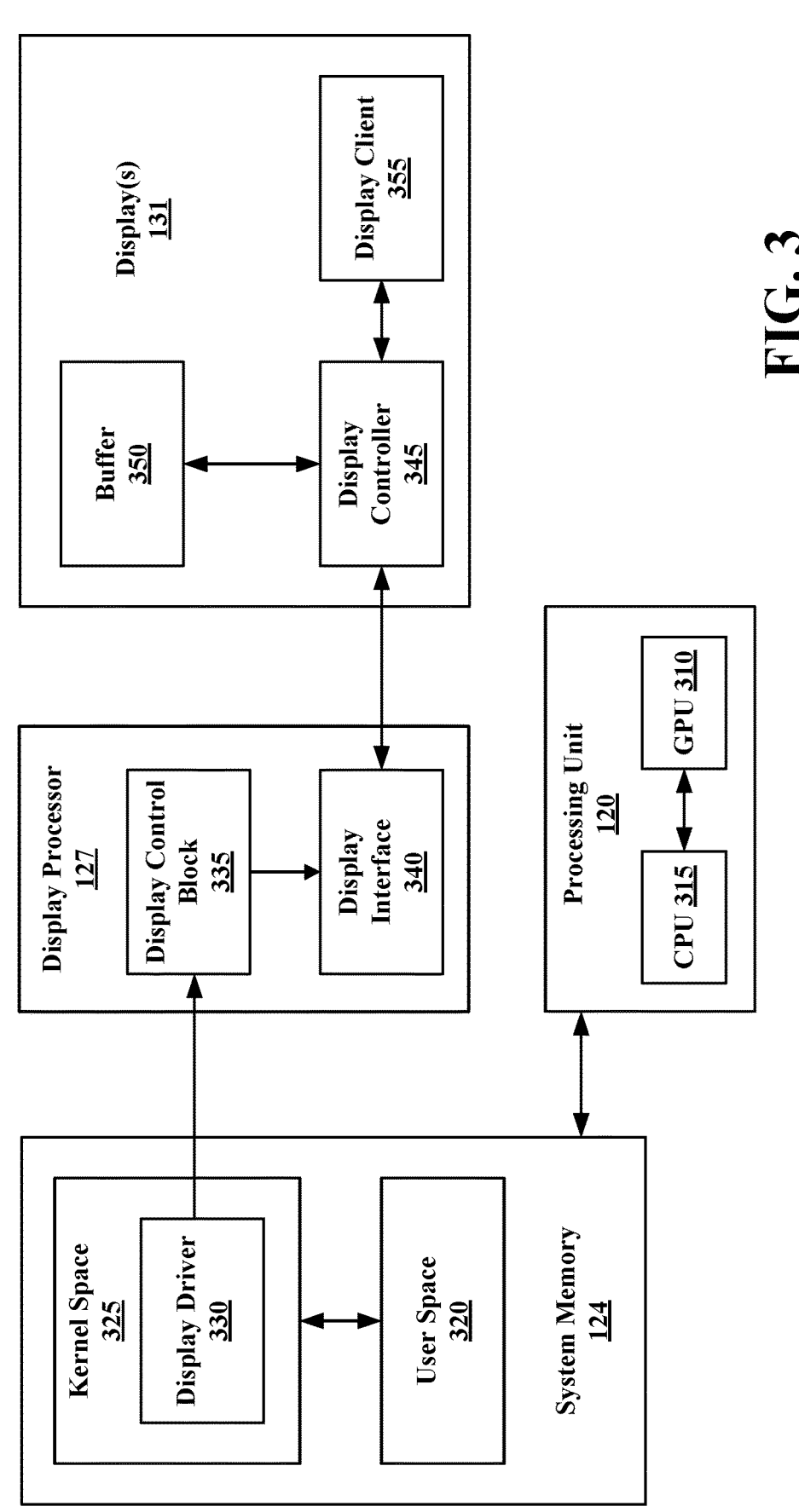
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350.

For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

In some aspects, a display device may present frames at different frame rates on the first display panel and the second display panel. For instance, a display panel may present frames at 60 frames per second (FPS) on both the first display panel and the second display panel, 45 FPS on both the first display panel and the second display panel, etc. The display device may synchronize frame rates of content with refresh rates of the display panels (via a vertical synchronization process, which may be referred to as vsync, Vsync, VSync, or VSYNC). For instance, content may be available at 60 FPS and the first display panel and the second display panel may have a refresh rate of 95 Hz. Via Vsync, the refresh rate of the first display panel and the second display panel may be set to 60 Hz to match the 60 FPS content.

As indicated herein, VSync is a graphics technology that synchronizes the frame rate of an application/game with a refresh rate at a display (e.g., a display on a client device). Vsync may be utilized as a manner in which to deal with screen tearing (i.e., the screen displays portions of multiple frames at once). That can result in the display appearing to be split along a line. Tearing may occur when the display refresh rate (i.e., how many times the display updates per second) is not in synchronization with the frames per second (FPS). VSync signals may synchronize the display pipeline (e.g., the pipeline including application rendering, compositor, and a hardware composer (HWC) that presents images on the display). For instance, VSync signals may help to synchronize the time in which applications wake up to start rendering, the time the compositor wakes up to composite the screen, and the display refresh cycle. This synchronization may help to eliminate display refresh issues and improve visual performance. In some examples, the HWC may generates VSync events/signals and send the events/signals to the compositor.

In some aspects of graphics processing, the rendering of content may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to client devices, where a portion of the graphics processing may be performed outside of the client device, e.g., at a server. In some aspects, the server may be at least one of: a phone, a smart phone, a computer, or a cloud server. Further, the client device may be at least one of: a headset, a head mounted display (HMD), display glasses, or smart glasses.

Split rendering may be performed for a number of different types of applications (e.g., virtual reality (VR) applications, augmented reality (AR) applications, mixed reality (MR) applications, and/or extended reality (XR) applications). In VR applications, the content displayed at the client device may correspond to man-made or animated content. In XR, AR, or MR content, a portion of the content displayed at the client device may correspond to real-world content (e.g., objects in the real world), and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa. Split XR, AR, or MR systems may also introduce latency when delivering the rendered content to the client display. In some aspects, this latency may be even higher when rendering occurs on a server than compared to client rendering, but it can also enable more complex XR, AR, or MR applications. In addition, there may be non-negligible latency between the time a camera pose is computed and the time the content appears on the client display. For instance, a certain amount of latency may be present in split XR, AR, or MR systems.

Figure 4:
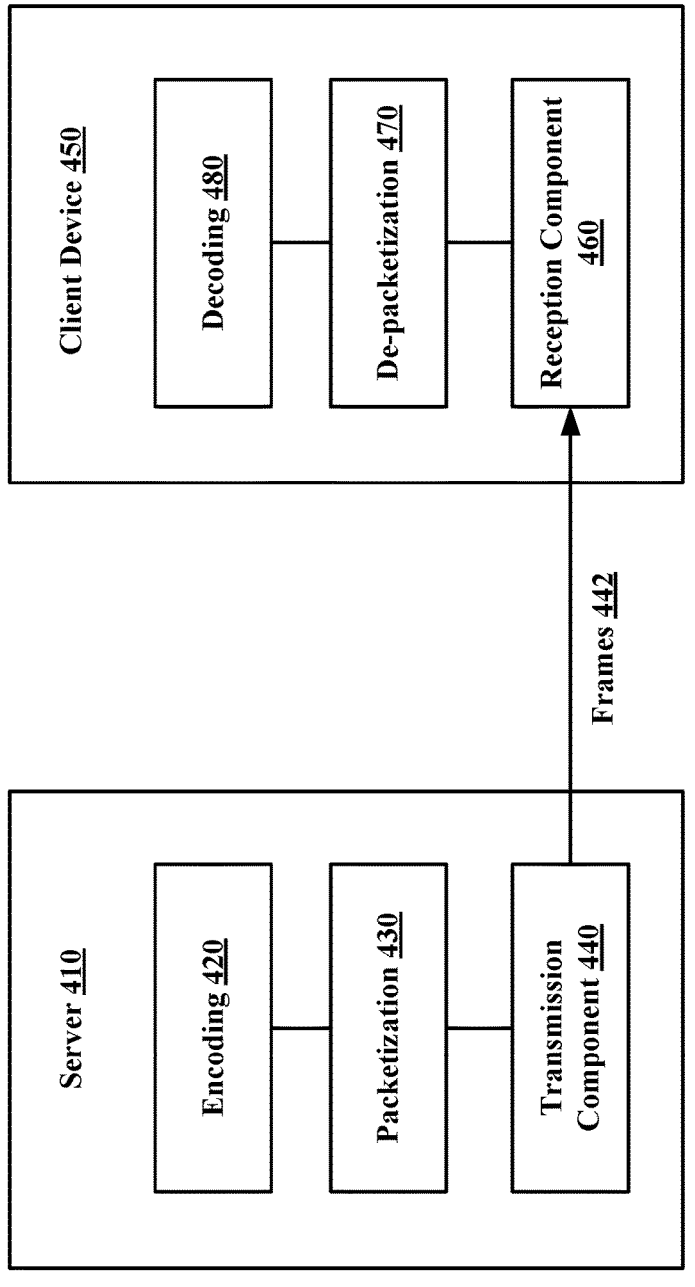
FIG. 4 is a diagram illustrating example communication of content/data in accordance with a split rendering process.
Figure 4:

FIG. 4 illustrates diagram 400 including communication of content/data in accordance with a split rendering process. As shown in FIG. 4, diagram 400 includes server 410 and client device 450 associated with the split rendering process. FIG. 4 shows a number of processes that are performed at the server 410 and the client device 450 including an encoding process 420, a packetization process 430, a de-packetization process 470, and a decoding process 480. Server 410 and client device 450 also include a transmission component 440 and a reception component 460, respectively.

As shown in FIG. 4, on the server 410, data/content associated with images/frames may be encoded during encoding process 420. After encoding process 420, the data/content may then undergo a packetization process 430, e.g., a real-time transport protocol (RTP) packetization process. During the packetization process, the data/content may be converted to one or more frames 442. The frames 442 may then be transmitted from the transmission component 440 of server 410 to the reception component 460 of client device 450. In some instances, the frames may be transmitted via a user datagram protocol (UDP) internet protocol (IP) (UDP/IP) network protocol, a transmission control protocol (TCP) IP (TCP/IP) network protocol, or any other network protocol. On the client device 450, the frames 442 may be received via the reception component 460 (e.g., received via a UDP/IP network protocol, a TCP/IP network protocol, or any other network protocol). The frames 442 may also undergo a de-packetization process 470 (e.g., a real-time transport protocol (RTP) de-packetization process or any other protocol de-packetization process), which may convert the data packets into data/content. After de-packetization, the data/content may be decoded during decoding process 480. Finally, the decoded data/content may be sent to a display or HMD of client device 450 for display of the data/content.

As indicated above, aspects of graphics processing may deal with rendering or displaying different types of content (e.g., virtual reality (VR) applications, augmented reality (AR) applications, mixed reality (MR) applications, and/or extended reality (XR) applications). The content may be rendered or created on a server, e.g., a computer or phone. To display this content, users may utilize different types of headsets or display glasses, which may be referred to as a client device. In some instances, when a user wants to use XR glasses for a long duration in the absence of a charging facility, it is desirable to save power at the server or client device. Also, when the battery of either the client device or the server is getting low (i.e., beyond a threshold percentage decided by the user) it is desirable to save power at the server or client device. Moreover, if a user wants to extent battery life voluntarily, then it is desirable to save power at the server or client device and provide a long battery life to either device.

In split rendering applications, content may be rendered on servers and encoded/streamed to XR-based HMDs over Wi-Fi. As indicated above, split rendering means the XR workload may be split between two devices, i.e., the host/server and the client/HMD. For example, one use case may be a smartphone connected to HMD/AR glasses. AR glasses may not have high processing capabilities, and heat dissipation may be an issue if all the processing is performed on the client/glasses. Accordingly, it is beneficial to split the rendering between the server and the client device.

In one aspect, a pose (e.g., a six degree of freedom (6DOF) pose) may be generated on the client device. The client/HMD may send the 6DOF pose data to the server via an uplink connection. An application or game may then render the content using the transmitted 6DOF pose on the server/phone. Also, the encoding of rendered content may occur on the server/phone. The encoded and compressed bit stream may then be transmitted from the server/phone to the HMD/client via a downlink connection. After this, video decoding and time warp processing may be performed on the HMD/client using the latest 6DOF pose. Finally, the HMD/client may display the reprojected content.

Figure 5:
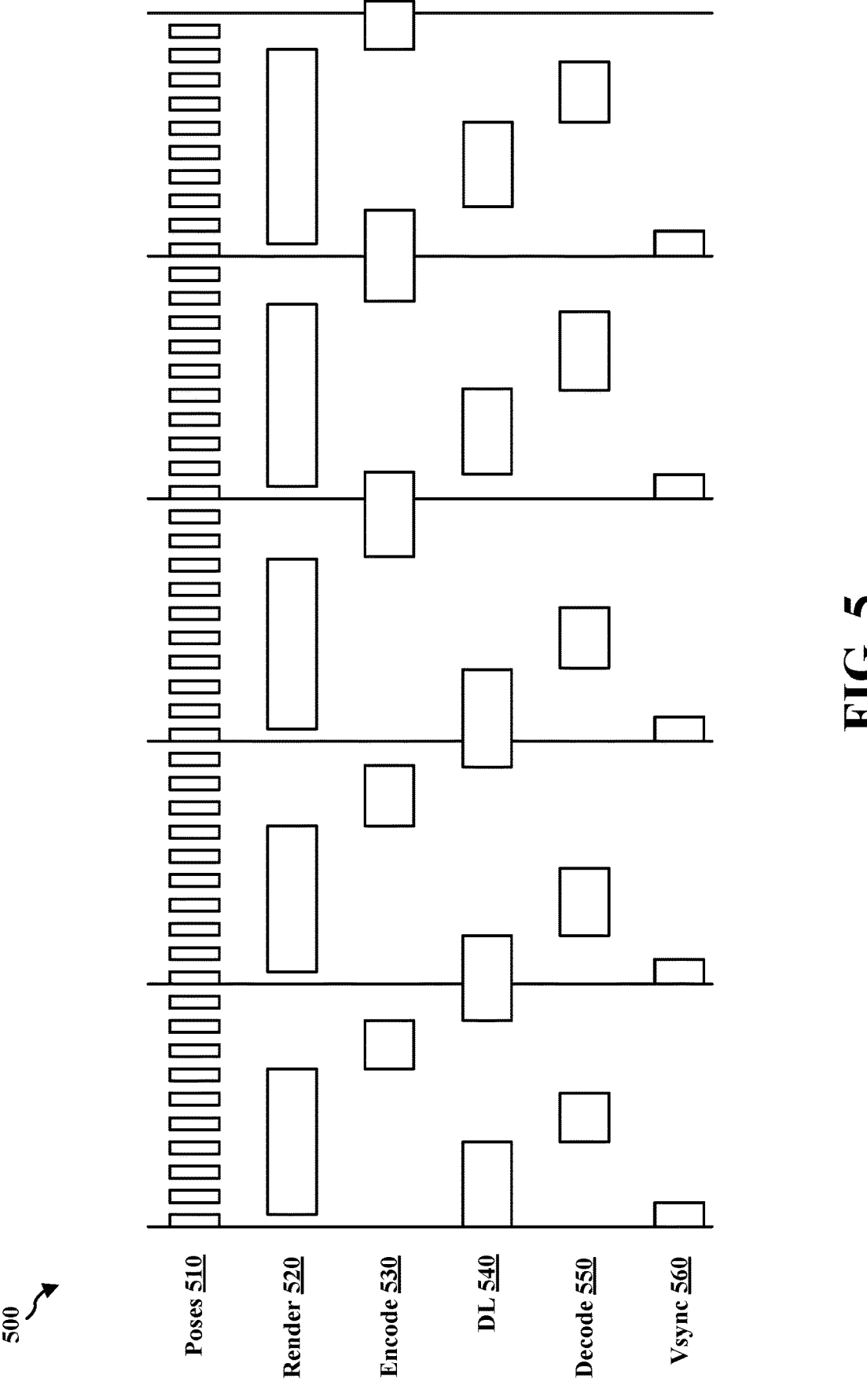
FIG. 5 is a diagram illustrating an example timeline of a split rendering process.

FIG. 5 illustrates a diagram 500 of an example timeline of a split rendering process. More specifically, FIG. 5 shows a diagram 500 of a timeline of different processing steps at a server (e.g., phone, smart phone, or computer) and a client device (e.g., headset, HMD, or smart glasses). For instance, a client device may transmit a number of poses 510 (e.g., head poses) to the server. The server may then render content for a frame at render process 520, as well as encode the frame at encode process 530. Also, the server may transmit the frame to the client device via downlink (DL) 540. After receiving the frame, the client device may decode the frame at decode process 550. FIG. 5 also shows a vertical synchronization (VSync) 560 that is associated with each of the transmissions.

As shown in FIG. 5, head pose data may be transmitted from the client device to the server (via uplink (UL)) at a high rate (e.g., 500 Hz) and/or a low latency. The client device (e.g., HMD/glasses) may be unaware of the rendering start time on the server (e.g., phone). The rendering of the first frame on the server may start at an arbitrary time using the latest pose followed by the rendering of future frames at a preconfigured frames-per-second (fps or FPS) rate. A rendering thread may render frames as fast as a GPU allows without any wait time, and in order to limit the fps, the wait time may be added at the end of each rendering. Also, the rendering thread may sleep until the wait time before starting the rendering for the next frame. Further, upon rendering, each rendered frame may be immediately queued for encoding. Once the encoding is completed, encoded frames may be packetized and transmitted (via downlink (DL)) at an arbitrary time (e.g., the post-rendering time plus the encode time). In some examples, a Wi-Fi modem may be always "on" so that the pose and frames may be transmitted with a minimum latency. Also, in some examples, on the UL side, a number of different types of information or data may also be transmitted (e.g., camera streaming data, color data or red (R) green (G) blue (B) (RGB) data, hand tracking data, and/or three-dimensional (3D) rendering (3DR) data).

Some aspects of split rendering may utilize a number of different features, such as a target wake time (TWT) and a timing synchronization function (TSF). The TWT feature may allow a modem/radio frequency (RF) to be to switched on at a fixed cadence and for a known service period. This TWT feature may be utilized to save power on the server and the client device. While TWT may ensure a power reduction on the modem side, the selection of TWT parameters may influence XR performance, such as the latency and frame reuse (i.e., judder). In some instances, the TWT feature may allow UL (pose) data and DL (rendered+encoded) frame data to be aligned with a TWT service period (on period), i.e., the transmission (Tx) and reception (Rx) on the client device and the server may happen simultaneously. When data is transmitted simultaneously within the same service period, it may provide the modem a chance to sleep for a certain time, which may reduce power and thermal issues. In some split XR scenarios, each client may have a timer synchronized with a timing synchronized function (TSF), e.g., associated with a server. Additionally, early termination may allow a service period to be terminated early on detection of inactivity of DL/UL data. Early termination processes may include an end of service period (EOSP). For example, the ESOP may terminate a service interval (i.e., transition the service interval from an "on" period to an "off" period). TWT may allow a modem to turn on and off at a defined cadence. TWT may also support early termination, such as if data is not present for transmission for a defined time period, the modem may turn off.

As indicated herein, there may be multiple subsystems that are involved in an XR pipeline from end to end. For example, a CPU, a GPU, an encoder, a decoder, a network, a server (e.g., a smartphone), and/or a client device (e.g., a headset, HMD, or AR glasses) may be involved in an end-to-end XR pipeline. Some types of client devices (e.g., wireless AR glasses) may need to have a sleek and light-weight design/form factor, which may pose a number of different issues, such as battery consumption (e.g., around 800 mW for system-on-chip (SOC) and double data rate (DDR) memory for some devices) and/or thermal dissipation. Additionally, in order to achieve a high quality user experience, certain display characteristics or conditions may be desired by the server and/or client device. For example, for a high quality user experience, a minimal amount of motion-to-render-to-photon (M2R2P) latency may be desired. Further, a minimal amount of frame loss or repeat may be desired by the server and/or client device.

In some aspects, once a head pose is transmitted from a client device (e.g., AR glasses) to a server (e.g., a phone) a new scene may be rendered, encoded, decoded, and then displayed (e.g., displayed at the client). However, the frame that is ultimately displayed on the client device (e.g., AR glasses) may be delayed by a certain amount, such as one VSync old (e.g., the frame was rendered/encoded one VSync time unit prior). Similarly, certain types of data (e.g., RGB camera data) may be encoded, transmitted, and decoded from the client device (e.g., AR glasses) to the server (e.g., a phone) in a delayed fashion. However, based on a number of different factors (e.g., the scene complexity, system workload, etc.), certain frames (e.g., DL frames) may be ready for display at an earlier time than is specified by VSync timing. In some aspects, these frames that would normally be ready may be delayed due to the occurrence of different frame issues (e.g., because of a variable rendering rate, higher encode time, and higher workload on subsystems like CPU, GPU, encode, decode, higher streaming latency, etc.), which results in frame repeats or frame misses. In these types of scenarios, motion-to-render-to-photon (M2R2P) latencies and user experience may be less than optimal. That is, there may be sub-optimal display performance due to fixed performance settings or configurations. For instance, there may be sub-optimal end-to-end performance in the split rendering pipeline due to fixed performance settings for multiple components in the pipeline from the server (e.g., phone) to the client device (e.g., HMD or AR glasses). Based on the above, it may be beneficial to improve power and/or performance issues across the split rendering pipeline. For instance, it may be beneficial to adjust the performance and content quality to mitigate the aforementioned issues (e.g., frame loss/repeat and/or M2R2P latencies). Additionally, it may be beneficial to improve an overall user experience in the split rendering pipeline.

Aspects of the present disclosure may improve or mitigate power and/or performance issues across the split rendering pipeline (e.g., a split XR/AR/MR rendering pipeline). For instance, aspects presented herein may adjust performance and content quality in order to mitigate a number of display/ frame issues (e.g., frame loss/repeat and/or M2R2P latencies). Additionally, aspects of the present disclosure may improve an overall user experience in the split rendering pipeline (e.g., a split XR/AR/MR rendering pipeline). In order to do so, aspects of the present disclosure may dynamically adjust the performance and/or the content quality in the split rendering pipeline. For example, aspects presented herein may perform dynamic performance adjustments and/or dynamic content quality adjustments. That is, aspects presented herein may improve an overall user experience in a split rendering pipeline (e.g., improve M2R2P latencies and/or frame loss/repeat issues) and reduce power and/or thermal issues by utilizing dynamic performance adjustments and/or dynamic content quality adjustments.

In some instances, aspects of the present disclosure may utilize dynamic performance adjustment (DPA) and dynamic power adjustment. In dynamic performance adjustment (DPA) utilized in aspects presented herein, the performance of each subsystem in the XR pipeline may be adjusted based on the predicted and current performance specifications. Also, aspects presented herein may adjust the content quality based on the predicted (i.e., estimated) and current (i.e., actual) performance specifications. Dynamic performance adjustment may predict or estimate a number of frame processing times utilized in split XR architecture. For instance, dynamic performance adjustment may predict: (1) a rendering time, (2) an encode time (e.g., encode time for rendered frames and camera frames), (3) a frame trans-mission time, (4) a decode time (e.g., decode time for rendered frames and camera frames), (5) other software latencies in the split XR pipeline. Also, dynamic perfor-mance adjustments presented herein may monitor a current render time, an encode time, a transmission time and a decode time with respect to frame prediction. Moreover, dynamic performance adjustments presented herein may boost subsystem performance and/or adjust content quality if any pipeline portion takes more time than predicted. By doing so, aspects presented herein may reduce the amount of frame loss/repeats. Further, when pipeline events complete earlier than expected, dynamic performance adjustments presented herein may reduce the performance of a subse-quent model in favor of power. By doing so, this may also improve the content quality produced in the split XR pipe-line.

Additionally, aspects presented herein may predict/esti-mate a number of frame processing times for a frame (e.g., at least one first frame) in a set of frames associated with split rendering (e.g., split XR rendering including a client device and a server). For instance, aspects presented herein may predict or estimate one or more of the following frame processing times for at least one first frame: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, and/or a frame reprojection time for the at least one first frame. The pose time may be a time when a pose for the at least one first frame is available at a server and/or a time for the server to generate pose information for the at least one first frame. This may include a pose generation time at the client side, a pose transmission time from the client to the server, and any other 6DOF latency. The frame render time may be a time for the at least one first frame to be rendered at the server or a client device. Also, the frame encode time may be a time for the at least one first frame to be encoded or compressed at the server. The frame encryption time may be a time for the at least one first frame to be encrypted at the server. The frame transmission time may be a time for the at least one first frame to be transmitted from the server to the client device. Further, the frame decryption time may be a time for the at least one first frame to be decrypted at the client device. The frame decode time may be a time for the at least one first frame to be decoded at the client device. The frame reprojection time may be a time for the at least one first frame to be reprojected at the client device. Moreover, aspects presented herein may detect/calculate a number of actual or current frame processing times for a frame (e.g., at least one first frame) in a set of frames associated with split rendering (e.g., split XR rendering including a client device and a server). For instance, aspects presented herein may detect or calculate one or more of the following actual/current frame processing times for at least one first frame: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, and/or a frame reprojection time for the at least one first frame.

Aspects presented herein may include a number of different details to adjust the performance and/or content quality within a split rendering pipeline. For instance, to adjust the performance within a split rendering pipeline, aspects presented herein may migrate/move workloads between CPU cores using a task affinity (e.g., silver, gold, etc.). Also, to adjust the performance within a split rendering pipeline, aspects presented herein may utilize clock or corner adjustments for certain components (e.g., CPU, GPU, encoder/decoder, etc.). Further, to adjust the performance within a split rendering pipeline, aspects presented herein may utilize network performance adjustments (e.g., modulation and coding scheme (MCS) rate adjustments, etc.). In some aspects, to adjust the content quality within a split rendering pipeline, aspects presented herein may utilize encoding compression adjustments (e.g., bitrate, group of pictures (GOP), etc.). Additionally, to adjust the content quality within a split rendering pipeline, aspects presented herein may adjust the content resolution.

Aspects presented herein relate to dynamic performance and power adjustment for end-to-end split XR systems and architectures. As indicated herein, multiple subsystems (e.g., CPU, GPU, encoder, decoder, etc.) may be involved in end-to-end split XR pipeline. Also, client devices (e.g., AR glass) may need to be light weight, as these devices may possess battery consumption challenges. Further, for a high quality user experience, a minimal possible M2R2P latencies and/or minimal (e.g., zero) frame loss or repeat may be desired. In some aspects, once a head pose is transmitted from a client to a server and a new scene is rendered, encoded, decoded and then displayed at the client device, the frame that is displayed on the client is already old. Thus, M2R2P latencies and user experience may not be optimal or suitable. There is sub-optimal end-to-end performance because of fixed performance settings for multiple components across a server and a client device (e.g., HMD or AR glasses). Aspects presented herein may focus on improving the user experience (e.g., M2R2P latencies) for split rendering, as well as reducing thermal power using dynamic performance adjustments and dynamic content quality adjustments. Aspects presented herein may provide dynamic performance adjustments, where each subsystem in the split rendering pipeline may be adjusted (and/or content quality may be adjusted) based on the predicted/estimated and actual/current performance specifications or conditions. For instance, dynamic performance adjustments may estimate/ predict performance specifications based on a frame render time, a frame encode time, a frame transmission time, a frame decode time, and other split rendering pipeline latencies. Also, dynamic performance adjustments herein may monitor a current/actual frame a current/actual frame render time, a current/actual frame encode time, a current/actual frame transmission time, and a current/actual frame decode time with respect to the estimation/prediction. By doing so, aspects presented herein may boost subsystem performance (and/or adjust content quality) if any component takes more time than predicted/estimated. This may also help to reduce frame losses or frame repeats. Further, whenever pipeline events complete earlier than expected, aspects presented herein may reduce the performance of a next/subsequent model in favor of power (and/or improve content quality).

Figure 6:
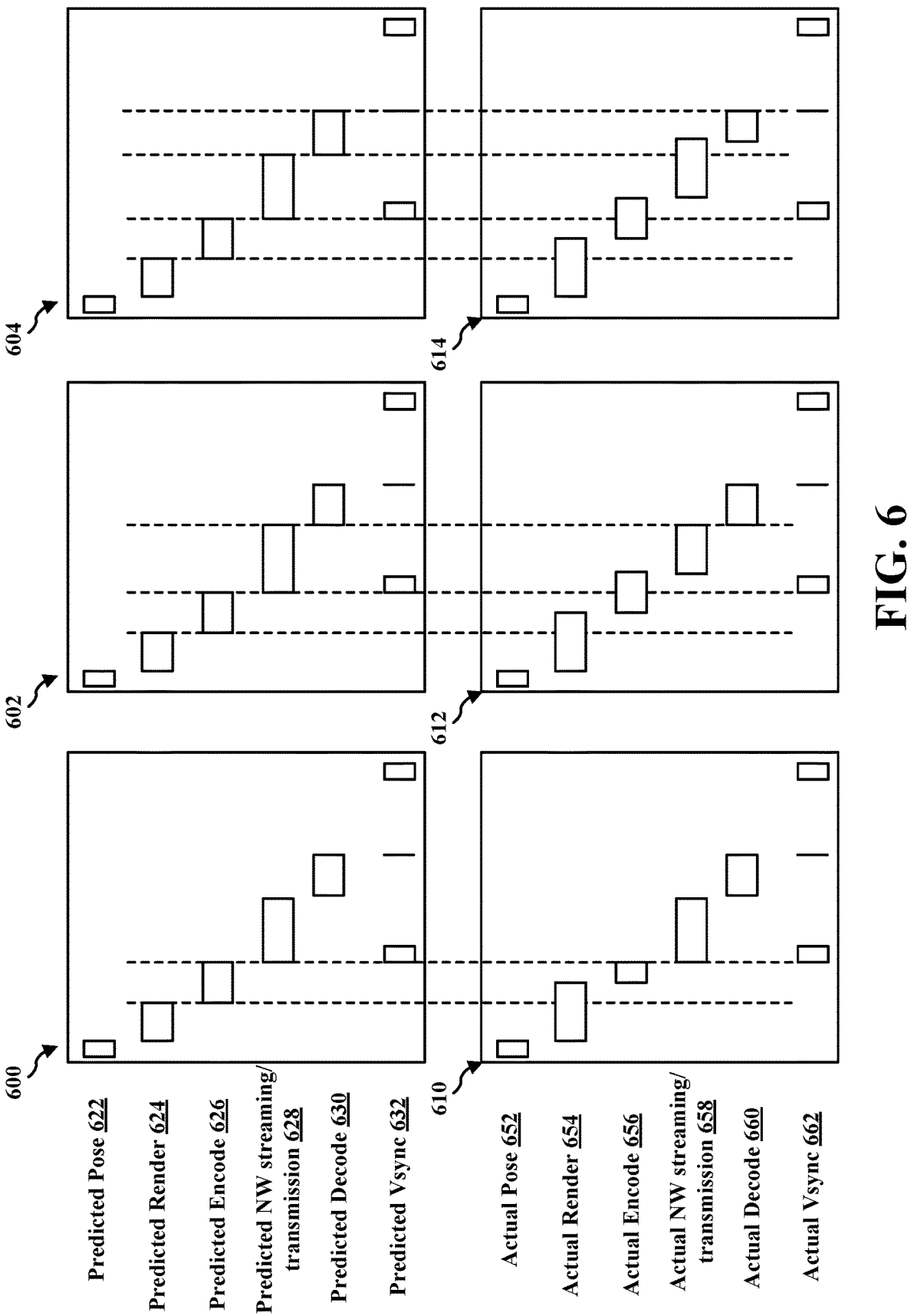
FIG. 6 includes diagrams illustrating example timelines of a split rendering process.

FIG. 6 includes a diagram 600, diagram 602, diagram 604, diagram 610, diagram 612, and diagram 614 illustrating example timelines of a split rendering process including a client device and a server. More specifically, diagram 600, diagram 602, diagram 604, diagram 610, diagram 612, and diagram 614 depict timelines of different frame processing times at a server (e.g., phone, smart phone, or computer) and a client device (e.g., headset, HMD, or smart glasses). That is, diagrams 600-614 depict a difference between predicted frame processing times and actual frame processing times. For instance, diagram 600, diagram 602, and diagram 604 include a number of predicted frame times (e.g., predicted pose time 622, predicted render time 624, a predicted encode time 626, a predicted network streaming/transmission time 628, a predicted decode time 630, and predicted Vsync time 632). In some aspects, a network (NW) streaming/transmission time may include a DL transmission time, an UL transmission time, and/or other software delays. Also, diagram 610, diagram 612, and diagram 614 include a number of actual frame times (e.g., actual pose time 652, actual render 654, actual time encode 656, actual network time streaming/transmission time 658, actual decode time 660, and actual Vsync time 662).

As shown in FIG. 6, the predicted pose time 622 is the predicted/estimated pose time at the client device or server, and the actual pose time 652 is the actual/current pose time at the client device or server. The predicted render time 624 is the predicted/estimated rendering time at the client device or server, and the actual render time 654 is the actual/current rendering time at the client device or server. Also, the predicted encode time 626 is the predicted/estimated encoding time at the client device or server, and the actual encode time 656 is the actual/current encoding time at the client device or server. The predicted network streaming/transmission time 628 is the predicted/estimated network transmission time of a frame, and the actual network streaming/ transmission time 658 is the actual/current transmission time of a frame. The predicted decode time 630 is the predicted/estimated decoding time at the client device or display device, and the actual decode time 660 is the actual/current decoding time at the client device or display device. The predicted Vsync time 632 is the predicted/estimated Vsync time, and the actual Vsync time 662 is the actual/current Vsync time.

As shown in diagram 600 and diagram 610, the actual render time 654 may take longer than the predicted render time 624. That is, the actual/current rendering time may take more time than the predicted/estimated rendering time. This may cause an increase in overall latencies (e.g., M2R2P latencies) and different frame issues (e.g., frame repeats and frame misses). In order to account for this issue, aspects presented herein may boost/increase a current module (e.g., a GPU) and/or boost/increase the performance of a next module (e.g., an encode module as represented in 656 where the encode module is boosted).

Additionally, as shown in diagram 602 and diagram 612, the actual render time 654 may take longer than the predicted render time 624. Also, the actual encode time 656 takes longer than the predicted encode time 626. That is, the actual/current rendering time and the actual/current encoding take more time than the predicted/estimated rendering time and the predicted/estimated encoding. This causes an increase in overall latencies (e.g., M2R2P latencies) and different frame issues (e.g., frame repeats and frame misses). In order to account for this issue, aspects presented herein may boost/increase a current module (e.g., a GPU) and/or boost/increase a next module (e.g., a render module, an encode module, etc.), as well as boost/increase the performance of the network transmission.

Further, as shown in diagram 604 and diagram 614, the actual render time 654 may take longer than the predicted render time 624. Also, the actual encode time 656 takes longer than the predicted encode time 626. And the actual network streaming/transmission time 658 takes longer than the predicted network streaming/transmission time 628. That is, the actual/current rendering time, the actual/current encoding, and the actual/current DL take more time than the predicted/estimated rendering time, the predicted/estimated encoding, and the predicted/estimated network streaming/transmission time. This causes an increase in overall latencies (e.g., M2R2P latencies) and different frame issues (e.g., frame repeats and frame misses. In order to account for this issue, aspects presented herein may boost/increase the performance of a current module (e.g., a GPU) and/or boost/increase the performance of a next module (e.g., an encode module), as well as boost/increase the performance of the encode time and network streaming/transmission time. Aspects presented herein may also boost/increase the performance of a decode time.

Figure 7:
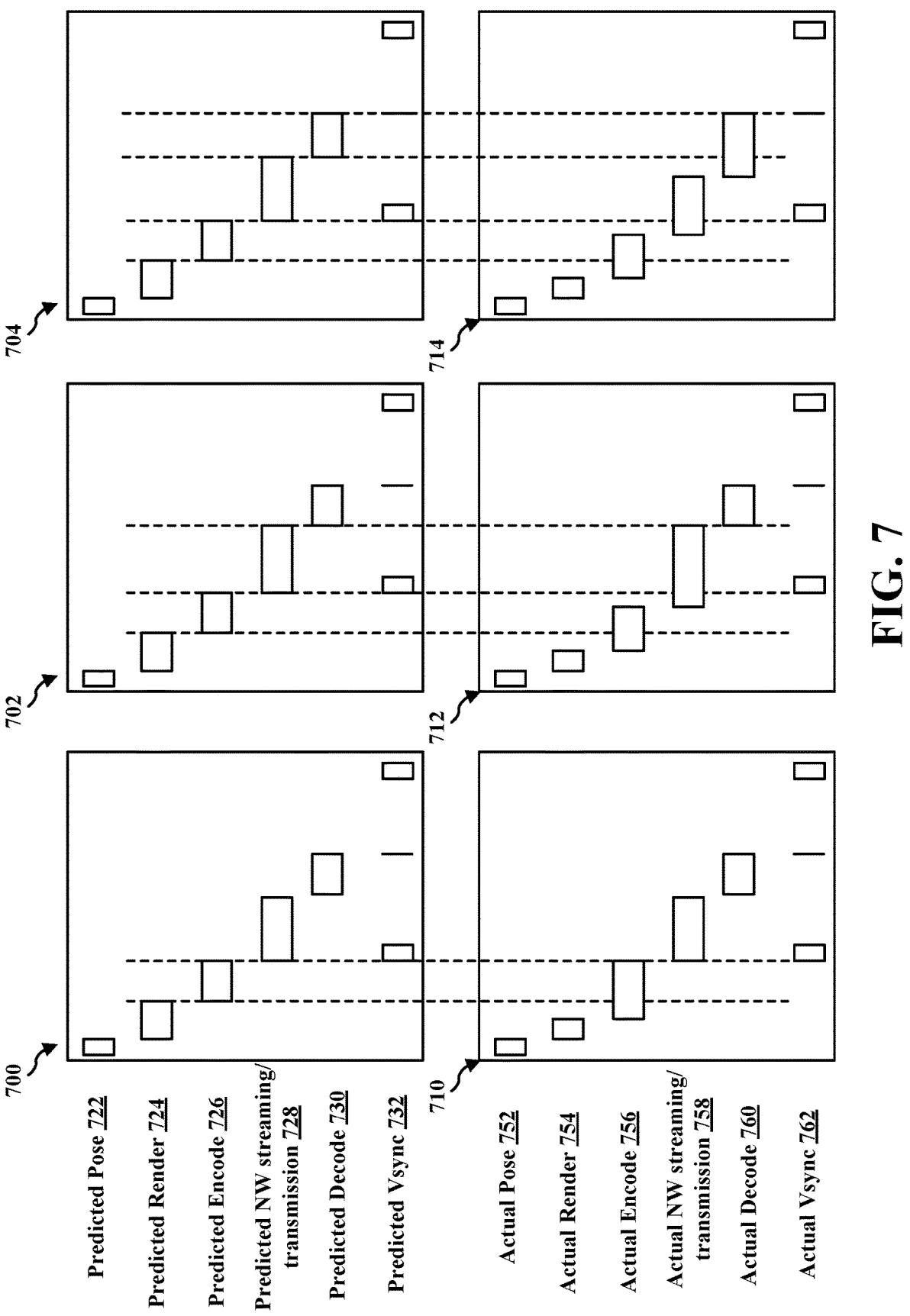
FIG. 7 is a diagram illustrating an example timelines of a split rendering process.

FIG. 7 includes a diagram 700, diagram 702, diagram 704, diagram 710, diagram 712, and diagram 714 illustrating example timelines of a split rendering process including a client device and a server. More specifically, diagram 700, diagram 702, diagram 704, diagram 710, diagram 712, and diagram 714 depict timelines of different frame processing times at a server (e.g., phone, smart phone, or computer) and a client device (e.g., headset, HMD, or smart glasses). That is, diagrams 700-714 depict a difference between predicted frame processing times and actual frame processing times. For instance, diagram 700, diagram 702, and diagram 704 include a number of predicted frame times (e.g., predicted pose time 722, predicted render time 724, a predicted encode time 726, a predicted network streaming/transmission time 728, a predicted decode time 730, and predicted Vsync time 732). Also, diagram 710, diagram 712, and diagram 714 include a number of actual frame times (e.g., actual pose time 752, actual render time 754, actual encode time 756, actual network streaming/transmission time 758, actual decode time 760, and actual Vsync time 762).

As shown in FIG. 7, the predicted pose time 722 is the predicted/estimated pose time at the client device or server, and the actual pose time 752 is the actual/current pose time at the client device or server. The predicted render time 724 is the predicted/estimated rendering time at the client device or server, and the actual render time 754 is the actual/current rendering time at the client device or server. Also, the predicted encode time 726 is the predicted/estimated encoding time at the client device or server, and the actual encode time 756 is the actual/current encoding time at the client device or server. The predicted network streaming/transmission time 728 is the predicted/estimated network transmission time of a frame, and the actual network streaming/transmission time 758 is the actual/current network transmission time of a frame. The predicted decode time 730 is the predicted/estimated decoding time at the client device or display device, and the actual decode time 760 is the actual/current decoding time at the client device or display device. The predicted Vsync time 732 is the predicted/estimated Vsync time, and the actual Vsync time 762 is the actual/current Vsync time.

As shown in diagram 700 and diagram 710, the actual render time 754 may take less time than the predicted render time 724. That is, the actual/current rendering time may take less time than the predicted/estimated rendering time. This causes frames to be available and displayed at an earlier time than specified by render FPS and VSync. In order to account for this issue, aspects presented herein may slow down/reduce performance of a next module which helps in reducing power consumption.

Additionally, as shown in diagram 702 and diagram 712, the actual render time 754 may take less time than the predicted render time 724. Also, the actual encode time 756 takes less time than the predicted encode time 726. That is, the actual/current rendering time and the actual/current encoding take less time than the predicted/estimated rendering time and the predicted/estimated encoding. This causes frames to be available and displayed at an earlier time than specified by render FPS and VSync. In order to account for this issue, aspects presented herein may slow down/reduce performance of a next module which helps in reducing power consumption, as well as slow down/adjust performance of the network transmission in order to reduce power consumption.

Further, as shown in diagram 704 and diagram 714, the actual render time 754 may take less time than the predicted render time 724. Also, the actual encode time 756 takes less time than the predicted encode time 726. And the actual network streaming/transmission time 758 takes less time than the predicted network streaming/transmission time 728. That is, the actual/current rendering time, the actual/current encoding, and the actual/current DL may take less time than the predicted/estimated rendering time, the predicted/estimated encoding, and the predicted/estimated network streaming/transmission time. This causes frames to be available and displayed at an earlier time than specified by render FPS and VSync. In order to account for this issue, aspects presented herein slow down a next module (e.g., an encode module), as well as slow down/adjust performance of the network transmission in order to reduce power consumption. Aspects presented herein may also slow down/reduce performance of a decode time.

As indicated herein, aspects presented herein may prediction the rendering, encoding, decoding, and network streaming/transmission time. Aspects of the present disclosure may implement the prediction in a number of different manners. For instance, aspects presented herein may utilize dynamically calculated statistical values (e.g., nth percentile, 95% values, etc.) of a previous time. That is, aspects presented herein may utilize 95% of render/encode/decode/ network streaming/transmission time calculated at runtime at a certain cadence (e.g., FPS/4) and this value is used by the dynamic performance adjustment module. Aspects presented herein may also utilize a machine learning (ML) regression model. This model may be built using the following variables to predict future values using regression. The ML regression may also utilize input features, such as a previous render time, a previous encode time, a previous network streaming/transmission time, a previous decode time, a number of usage and statistics clocks (e.g., CPU, GPU, encode, DDR usage statistics and clocks). The ML regression may also utilize an output, such as a render time, an encode time, a network streaming/transmission time, and/or a decode time.

Figure 8:
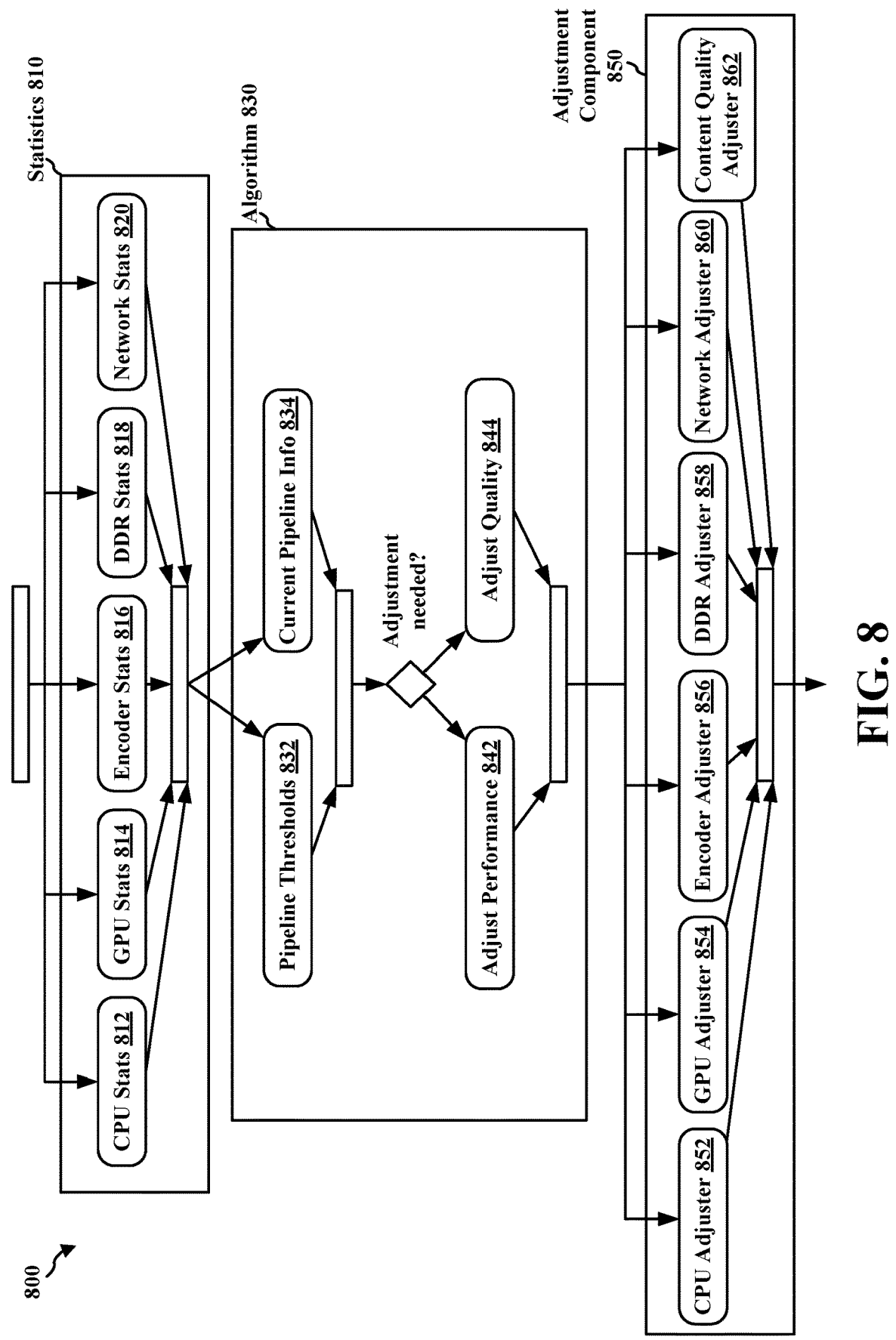
FIG. 8 is a diagram illustrating an example block diagram of a split rendering process.

FIG. 8 is a diagram 800 illustrating an example block diagram of a split rendering process. More specifically, diagram 800 depicts a split rendering process including a dynamic performance adjustment. As shown in FIG. 8, diagram 800 includes a statistics model 810, an algorithm model 830, and an adjustment component model 850. FIG. 8 depicts that an input is sent to statistics model 810 including CPU statistics 812, GPU statistics 814, encoder statistics 816, DDR statistics 818, and network statistics 820. The output of statistics model 810 is sent to algorithm model 830 including pipeline thresholds 832 and current pipeline information 834. Next, a determination is made regarding whether an adjustment is needed. After this, the determination is sent to the adjust performance component 842 or the adjust quality component 844. The output of algorithm model 830 is sent to adjustment component model 850 including CPU adjuster 852 (to scale CPU performance), GPU adjuster 854 (to scale GPU performance), encoder adjuster 856 (to scale encoder performance), DDR adjuster 858 (to scale DDR performance), network adjuster 860 (to scale network performance), and content quality adjuster 862 (to adjust the content quality). Next, algorithm model 830 outputs this result.

Figure 9:
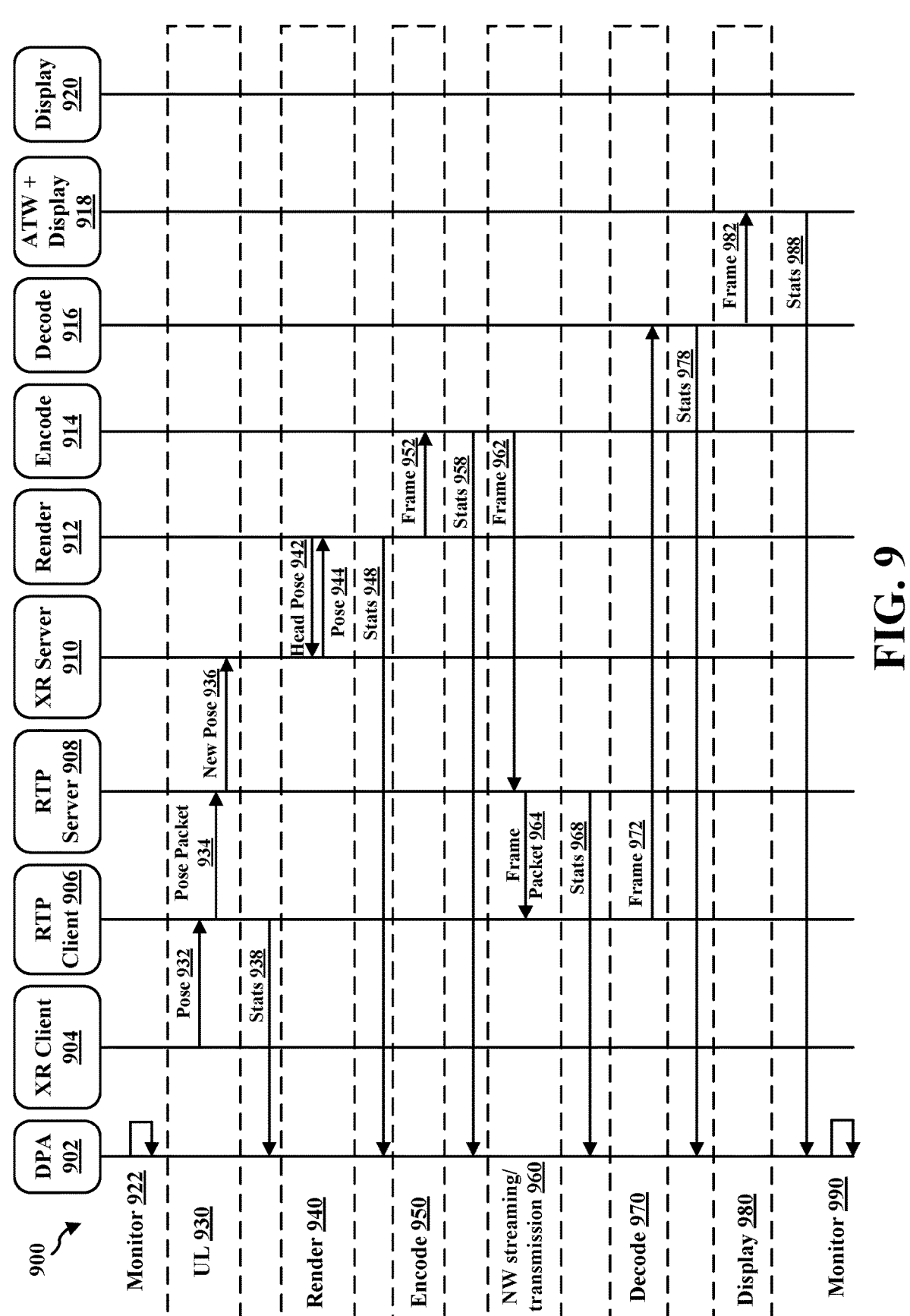
FIG. 9 is a diagram illustrating an example timeline of a split rendering process.

FIG. 9 is a diagram 900 illustrating an example timeline of a split rendering process. More specifically, diagram 900 depicts the functional components and sequence diagram of split XR framework. As shown in FIG. 9, diagram 900 includes dynamic performance adjustment (DPA) component 902, XR client 904, real-time transport protocol (RTP) client 906, RTP server 908, XR server 910, render component 912, encode component 914, decode component 916, asynchronous time warp (ATW) and display component 918, and display 920. FIG. 9 also depicts a number of frame processing times, such as UL time 930, render time 940, encode time 950, network streaming/transmission time 960, decode time 970, and display time 980. As depicted in FIG. 9, the DPA component 902 interacts with render component 912, encode component 914, decode component 916, and networking module to calculate predicted frame processing times and current frame processing times. Based on these values, the DPA component 902 may adjust the performance of each of the other components/modules.

As shown in FIG. 9, at 922, the DPA component 902 monitors for frame information. At 932, XR client 904 sends pose information to RTP client 906. At 934, RTP client 906 sends pose packet information to RTP server 908. At 936, RTP server 908 sends new pose information to XR server 910. At 938, RTP client 906 sends statistics (e.g., frame processing times) to DPA component 902. At 942, render component 912 sends head pose information to XR server 910. At 944, XR server 910 sends pose information to render component 912. At 948, render component 912 sends statistics (e.g., frame processing times) to DPA component 902. At 952, render component 912 sends frame information to encode component 914. At 958, encode component 914 sends statistics (e.g., frame processing times) to DPA component 902. At 962, encode component 914 sends frame information to RTP server 908. At 964, RTP server 908 sends frame packet information to RTP client 906. At 968, RTP server 908 sends statistics (e.g., frame processing times) to DPA component 902. At 972, RTP client 906 sends frame information to decode component 916. At 978, decode component 916 sends statistics (e.g., frame processing times) to DPA component 902. At 982, decode component 916 sends frame information to ATW and display component 918. At 988, ATW and display component 918 sends statistics (e.g., frame processing times) to DPA component 902. At 990, the DPA component 902 monitors for frame information.

Additionally, as shown in FIG. 9, DPA component 902 may estimate a set of frame processing times for at least one first frame in a set of frames. To estimate the set of frame processing times for the at least one first frame, DPA component 902 may estimate the set of frame processing times for the at least one first frame based on a target vertical synchronization (Vsync) time. Also, to estimate the set of frame processing times for the at least one first frame, DPA component 902 may estimate the set of frame processing times for the at least one first frame based on at least one of: a machine learning (ML) model, an artificial intelligence (AI) model, or a statistical model. An ML or AI model can be trained offline on a computer or on edge computing, and the current frame processing time can be utilized to improve models remotely via transfer learning. DPA component 902 may also detect a set of actual frame processing times for the at least one first frame in the set of frames. To detect the set of actual frame processing times for the at least one first frame in the set of frames, DPA component 902 may detect the set of actual frame processing times for the at least one first frame based on the target Vsync time. Also, to detect the set of actual frame processing times for the at least one first frame in the set of frames, DPA component 902 may calculating the set of actual frame processing times for the at least one first frame. Further, DPA component 902 may output, based on the set of estimated frame processing times and the set of actual frame processing times, an indication to adjust a set of second frame processing times for at least one second frame in the set of frames, where the at least one second frame is subsequent to the at least one first frame in the set of frames.

In some aspects, DPA component 902 may also adjust, based on the set of estimated frame processing times and the set of actual frame processing times, the set of second frame processing times for the at least one second frame. In order to adjust the set of second frame processing times for the at least one second frame, DPA component 902 may perform a number of different actions. For instance, DPA component 902 may increase the set of second frame processing times for the at least one second frame based on the set of actual frame processing times for the at least one first frame being less than the set of estimated frame processing times for the at least one first frame. DPA component 902 may also decrease the set of second frame processing times for the at least one second frame based on the set of actual frame processing times for the at least one first frame being greater than the set of estimated frame processing times for the at least one first frame. Also, DPA component 902 may adjust a workload associated with a central processing unit (CPU) or a graphics processing unit (GPU) for the at least one second frame. DPA component 902 may also adjust, for the at least one second frame, a clock or a corner associated with at least one of: a central processing unit (CPU), a graphics processing unit (GPU), an encoder, a decoder, or a double data rate (DDR) memory. DPA component 902 may also adjust a data rate or a modulation and coding scheme (MCS) rate for the at least one second frame. Moreover, DPA component 902 may adjust, for the at least one second frame, at least one of: an encoding rate, a compression rate, a bitrate, or a group of pictures (GOP) rate. DPA component 902 may also adjust a content resolution for the at least one second frame.

Aspects of the present disclosure may include a number of benefits or advantages. For instance, aspects presented herein may improve an overall user experience for split rendering. That is, aspects presented herein may utilize a dynamic performance adjustment that may help to reduce frame repeats/misses and improve overall latency. Also, aspects presented herein may utilize a dynamic performance adjustment that may help to improve content quality and/or user experience. Aspects presented herein may also adjust or reduce the amount of power utilized for split rendering. For example, aspects presented herein may utilize a dynamic performance adjustment that may help to reduce performance of multiple subsystem whenever possible. Also, aspects presented herein may utilize a dynamic performance adjustment that may help to reduce power consumption and thermal power. Aspects of the present disclosure may also improve or mitigate power and/or performance issues across the split rendering pipeline (e.g., a split XR/AR/MR rendering pipeline). For example, aspects presented herein may adjust performance and content quality in order to mitigate a number of display/frame issues (e.g., frame loss/repeat and/or M2R2P latencies). Further, aspects of the present disclosure may improve an overall user experience in the split rendering pipeline (e.g., a split XR/AR/MR rendering pipeline). In order to do so, aspects of the present disclosure may dynamically adjust the performance and/or the content quality in the split rendering pipeline. For instance, aspects presented herein may perform dynamic performance adjustments and/or dynamic content quality adjustments. That is, aspects presented herein may improve an overall user experience in a split rendering pipeline (e.g., improve M2R2P latencies and/or frame loss/repeat issues) and reduce power and/or thermal issues by utilizing dynamic performance adjustments and/or dynamic content quality adjustments.

Figure 10:
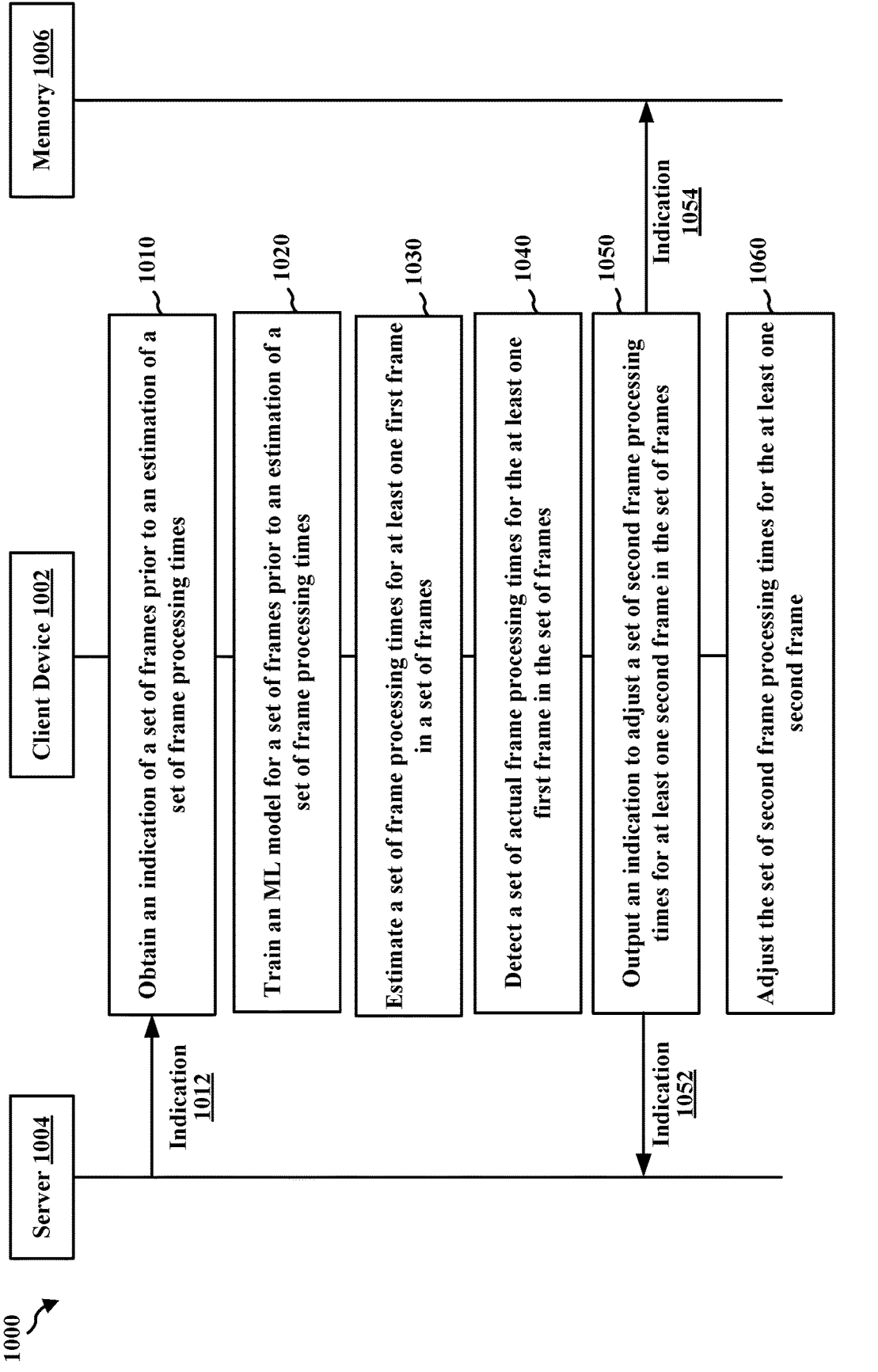
FIG. 10 is a communication flow diagram illustrating example communications between a client device, a server, and a memory.

FIG. 10 is a communication flow diagram 1000 of frame processing in accordance with one or more techniques of this disclosure. As shown in FIG. 10, diagram 1000 includes example communications between client device 1002 (e.g., a client, a headset, HMD, AR glasses, a server, phone, or smartphone), server 1004 (e.g., a server, phone, smartphone, a client, a headset, HMD, or AR glasses), and memory 1006 (e.g., a memory or a cache), in accordance with one or more techniques of this disclosure.

At 1010, client device 1002 may obtain an indication of a set of frames prior to an estimation of a set of frame processing times (e.g., client device 1002 may receive indication 1012 from server 1004). In some aspects, estimating the set of frame processing times for the at least one first frame comprises: estimating the set of frame processing times for the at least one first frame based on the indication of the set of frames.

At 1020, client device 1002 may train a machine learning (ML) model for a set of frames prior to an estimation of a set of frame processing times. In some aspects, estimating the set of frame processing times for the at least one first frame comprises: estimating the set of frame processing times for the at least one first frame based on the ML model.

At 1030, client device 1002 may estimate a set of frame processing times for at least one first frame in a set of frames. In some aspects, estimating the set of frame processing times for the at least one first frame may comprise: estimating the set of frame processing times for the at least one first frame based on a target vertical synchronization (Vsync) time. Also, estimating the set of frame processing times for the at least one first frame may comprise: estimating the set of frame processing times for the at least one first frame based on at least one of: a machine learning (ML) model, an artificial intelligence (AI) model, or a statistical model. In some aspects, the set of estimated frame processing times for the at least one first frame may include one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame. Additionally, the pose time may be a time when a pose for the at least one first frame is available at a server or a time for the server to generate pose information for the at least one first frame, the frame render time is a time for the at least one first frame to be rendered at the server or a client device, the frame encode time may be a time for the at least one first frame to be encoded or compressed at the server, the frame encryption time may be a time for the at least one first frame to be encrypted at the server, the frame transmission time may be a time for the at least one first frame to be transmitted from the server to the client device, the frame decryption time may be a time for the at least one first frame to be decrypted at the client device, the frame decode time may be a time for the at least one first frame to be decoded at the client device, and the frame reprojection time is a time for the at least one first frame to be reprojected at the client device.

At 1040, client device 1002 may detect a set of actual frame processing times for the at least one first frame in the set of frames. In some aspects, detecting the set of actual frame processing times for the at least one first frame may comprise: detecting the set of actual frame processing times for the at least one first frame based on the target Vsync time. Also, detecting the set of actual frame processing times for the at least one first frame may comprise: calculating the set of actual frame processing times for the at least one first frame. Additionally, detecting the set of actual frame processing times for the at least one first frame comprises: obtaining an indication of the set of actual frame processing times for the at least one first frame. Further, obtaining the indication of the set of actual frame processing times for the at least one first frame comprises: receiving, from a client device or a server, the indication of the set of actual frame processing times for the at least one first frame In some aspects, the set of actual frame processing times for the at least one first frame may include one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame. Additionally, the pose time may be a time when a pose for the at least one first frame is available at a server or a time for the server to generate pose information for the at least one first frame, the frame render time is a time for the at least one first frame to be rendered at the server or a client device, the frame encode time may be a time for the at least one first frame to be encoded or compressed at the server, the frame encryption time may be a time for the at least one first frame to be encrypted at the server, the frame transmission time may be a time for the at least one first frame to be transmitted from the server to the client device, the frame decryption time may be a time for the at least one first frame to be decrypted at the client device, the frame decode time may be a time for the at least one first frame to be decoded at the client device, and the frame reprojection time is a time for the at least one first frame to be reprojected at the client device.

At 1050, client device 1002 may output, based on the set of estimated frame processing times and the set of actual frame processing times, an indication to adjust a set of second frame processing times for at least one second frame in the set of frames, where the at least one second frame is subsequent to the at least one first frame in the set of frames. In some aspects, outputting the indication to adjust the set of second frame processing times for the at least one second frame comprises: transmitting, to a client device or a server, the indication to adjust the set of second frame processing times for the at least one second frame (e.g., client device 1002 may transmit indication 1052 to server 1004). Also, outputting the indication to adjust the set of second frame processing times for the at least one second frame comprises: storing, in a memory or a cache, the indication to adjust the set of second frame processing times for the at least one second frame (e.g., client device 1002 may store indication 1054 in memory 1006).

At 1060, client device 1002 may adjust, based on the set of estimated frame processing times and the set of actual frame processing times, the set of second frame processing times for the at least one second frame. In some aspects, adjusting the set of second frame processing times for the at least one second frame may comprise: increasing the set of second frame processing times for the at least one second frame based on the set of actual frame processing times for the at least one first frame being less than the set of estimated frame processing times for the at least one first frame. Also, adjusting the set of second frame processing times for the at least one second frame may comprise: decreasing the set of second frame processing times for the at least one second frame based on the set of actual frame processing times for the at least one first frame being greater than the set of estimated frame processing times for the at least one first frame. Further, adjusting the set of second frame processing times for the at least one second frame may comprise: adjusting a workload associated with a central processing unit (CPU) or a graphics processing unit (GPU) for the at least one second frame. Moreover, adjusting the set of second frame processing times for the at least one second frame may comprise: adjusting, for the at least one second frame, a clock or a corner associated with at least one of: a central processing unit (CPU), a graphics processing unit (GPU), an encoder, a decoder, or a double data rate (DDR) memory. Also, adjusting the set of second frame processing times for the at least one second frame may comprise: adjusting a data rate or a modulation and coding scheme (MCS) rate for the at least one second frame. Further, adjusting the set of second frame processing times for the at least one second frame may comprise: adjusting, for the at least one second frame, at least one of: an encoding rate, a compression rate, a bitrate, or a group of pictures (GOP) rate. Moreover, adjusting the set of second frame processing times for the at least one second frame may comprise: adjusting a content resolution for the at least one second frame.

Figure 11:
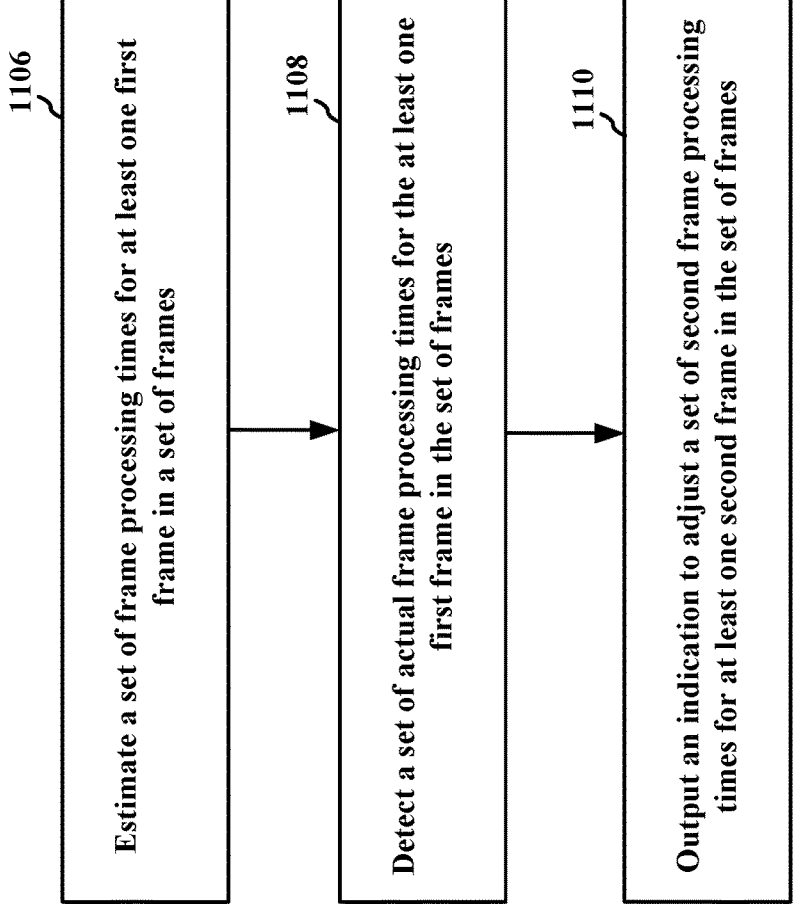
FIG. 11 is a flowchart of an example method of frame processing.
Figure 11:

FIG. 11 is a flowchart 1100 of an example method of image processing in accordance with one or more techniques of this disclosure. The method may be performed by a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, and/or any apparatus that may perform frame processing as used in connection with the examples of FIGS. 1-10.

At 1106, the client device may estimate a set of frame processing times for at least one first frame in a set of frames, as described in connection with the examples in FIGS. 1-10. For example, as described in 1030 of FIG. 10, client device 1002 may estimate a set of frame processing times for at least one first frame in a set of frames. Further, step 1106 may be performed by display processor 127 in FIG. 1. In some aspects, estimating the set of frame processing times for the at least one first frame comprises: estimating the set of frame processing times for the at least one first frame based on the ML model. In some aspects, estimating the set of frame processing times for the at least one first frame may comprise: estimating the set of frame processing times for the at least one first frame based on a target vertical synchronization (Vsync) time. In some aspects, estimating the set of frame processing times for the at least one first frame comprises: estimating the set of frame processing times for the at least one first frame based on the indication of the set of frames. Also, estimating the set of frame processing times for the at least one first frame may comprise: estimating the set of frame processing times for the at least one first frame based on at least one of: a machine learning (ML) model, an artificial intelligence (AI) model, or a statistical model. In some aspects, the set of estimated frame processing times for the at least one first frame may include one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame. Additionally, the pose time may be a time when a pose for the at least one first frame is available at a server or a time for the server to generate pose information for the at least one first frame, the frame render time is a time for the at least one first frame to be rendered at the server or a client device, the frame encode time may be a time for the at least one first frame to be encoded or compressed at the server, the frame encryption time may be a time for the at least one first frame to be encrypted at the server, the frame transmission time may be a time for the at least one first frame to be transmitted from the server to the client device, the frame decryption time may be a time for the at least one first frame to be decrypted at the client device, the frame decode time may be a time for the at least one first frame to be decoded at the client device, and the frame reprojection time is a time for the at least one first frame to be reprojected at the client device.

At 1108, the client device may detect a set of actual frame processing times for the at least one first frame in the set of frames, as described in connection with the examples in FIGS. 1-10. For example, as described in 1040 of FIG. 10, client device 1002 may detect a set of actual frame processing times for the at least one first frame in the set of frames. Further, step 1108 may be performed by display processor 127 in FIG. 1. In some aspects, detecting the set of actual frame processing times for the at least one first frame may comprise: detecting the set of actual frame processing times for the at least one first frame based on the target Vsync time. Also, detecting the set of actual frame processing times for the at least one first frame may comprise: calculating the set of actual frame processing times for the at least one first frame. Additionally, detecting the set of actual frame processing times for the at least one first frame comprises: obtaining an indication of the set of actual frame processing times for the at least one first frame. Further, obtaining the indication of the set of actual frame processing times for the at least one first frame comprises: receiving, from a client device or a server, the indication of the set of actual frame processing times for the at least one first frame In some aspects, the set of actual frame processing times for the at least one first frame may include one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame. Additionally, the pose time may be a time when a pose for the at least one first frame is available at a server or a time for the server to generate pose information for the at least one first frame, the frame render time is a time for the at least one first frame to be rendered at the server or a client device, the frame encode time may be a time for the at least one first frame to be encoded or compressed at the server, the frame encryption time may be a time for the at least one first frame to be encrypted at the server, the frame transmission time may be a time for the at least one first frame to be transmitted from the server to the client device, the frame decryption time may be a time for the at least one first frame to be decrypted at the client device, the frame decode time may be a time for the at least one first frame to be decoded at the client device, and the frame reprojection time is a time for the at least one first frame to be reprojected at the client device.

At 1110, the client device may output, based on the set of estimated frame processing times and the set of actual frame processing times, an indication to adjust a set of second frame processing times for at least one second frame in the set of frames, where the at least one second frame is subsequent to the at least one first frame in the set of frames, as described in connection with the examples in FIGS. 1-10. For example, as described in 1050 of FIG. 10, client device 1002 may output, based on the set of estimated frame processing times and the set of actual frame processing times, an indication to adjust a set of second frame processing times for at least one second frame in the set of frames, where the at least one second frame is subsequent to the at least one first frame in the set of frames. Further, step 1110 may be performed by display processor 127 in FIG. 1. In some aspects, outputting the indication to adjust the set of second frame processing times for the at least one second frame comprises: transmitting, to a client device or a server, the indication to adjust the set of second frame processing times for the at least one second frame (e.g., client device 1002 may transmit indication 1052 to server 1004). Also, outputting the indication to adjust the set of second frame processing times for the at least one second frame comprises: storing, in a memory or a cache, the indication to adjust the set of second frame processing times for the at least one second frame (e.g., client device 1002 may store indication 1054 in memory 1006).

Figure 12:
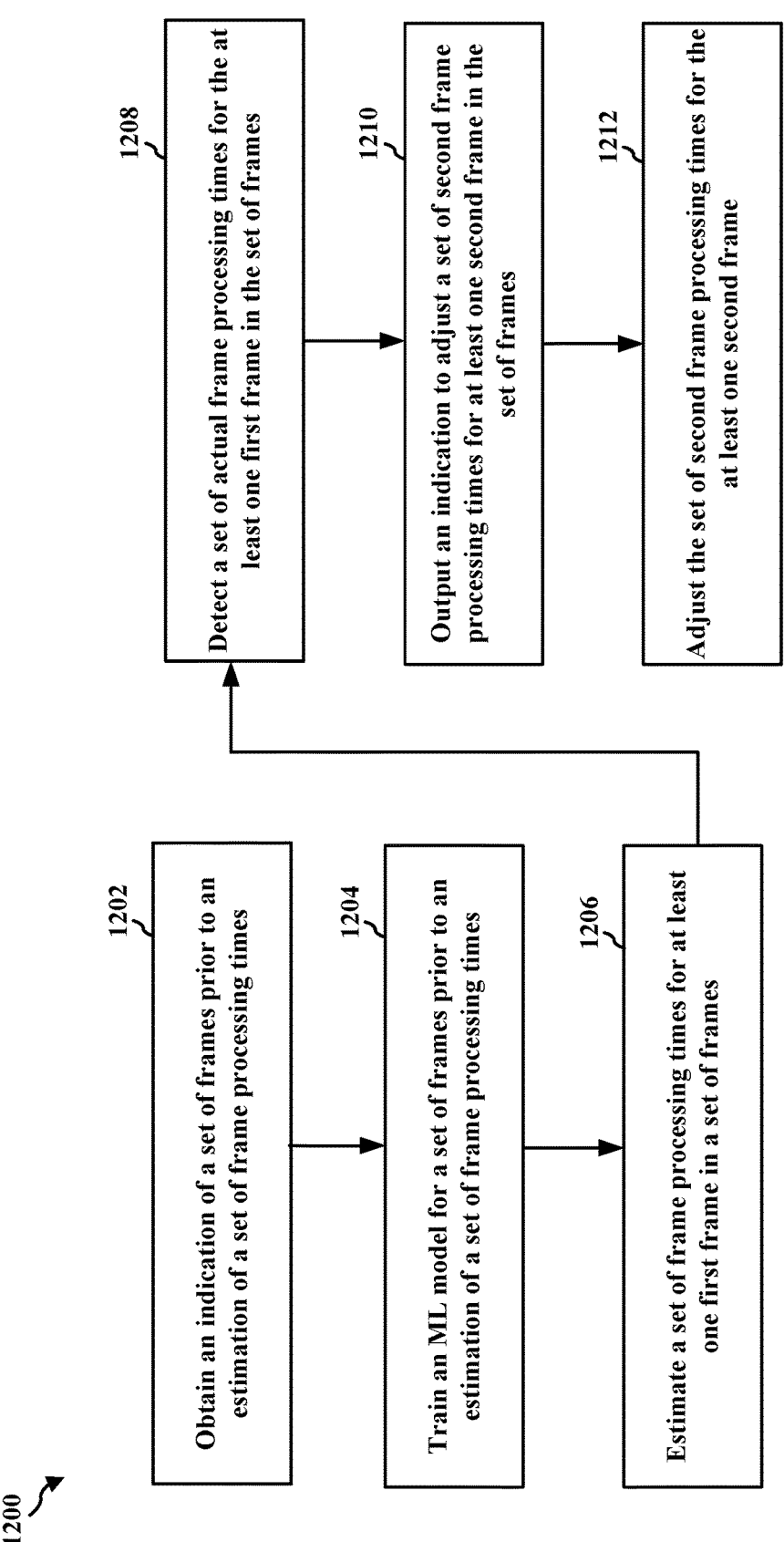
FIG. 12 is a flowchart of an example method of frame processing.

FIG. 12 is a flowchart 1200 of an example method of image processing in accordance with one or more techniques of this disclosure. The method may be performed by a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, and/or any apparatus that may perform frame processing as used in connection with the examples of FIGS. 1-10.

At 1202, the client device may obtain an indication of a set of frames prior to an estimation of a set of frame processing times, as described in connection with the examples in FIGS. 1-10. For example, as described in 1010 of FIG. 10, client device 1002 may obtain an indication of a set of frames prior to an estimation of a set of frame processing times. Further, step 1202 may be performed by display processor 127 in FIG. 1.

At 1204, the client device may train a machine learning (ML) model for a set of frames prior to an estimation of a set of frame processing times, as described in connection with the examples in FIGS. 1-10. For example, as described in 1020 of FIG. 10, client device 1002 may train a machine learning (ML) model for a set of frames prior to an estimation of a set of frame processing times. Further, step 1204 may be performed by display processor 127 in FIG. 1.

At 1206, the client device may estimate a set of frame processing times for at least one first frame in a set of frames, as described in connection with the examples in FIGS. 1-10. For example, as described in 1030 of FIG. 10, client device 1002 may estimate a set of frame processing times for at least one first frame in a set of frames. Further, step 1206 may be performed by display processor 127 in FIG. 1. In some aspects, estimating the set of frame processing times for the at least one first frame comprises: estimating the set of frame processing times for the at least one first frame based on the ML model. In some aspects, estimating the set of frame processing times for the at least one first frame may comprise: estimating the set of frame processing times for the at least one first frame based on a target vertical synchronization (Vsync) time. In some aspects, estimating the set of frame processing times for the at least one first frame comprises: estimating the set of frame processing times for the at least one first frame based on the indication of the set of frames. Also, estimating the set of frame processing times for the at least one first frame may comprise: estimating the set of frame processing times for the at least one first frame based on at least one of: a machine learning (ML) model, an artificial intelligence (AI) model, or a statistical model. In some aspects, the set of estimated frame processing times for the at least one first frame may include one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame. Additionally, the pose time may be a time when a pose for the at least one first frame is available at a server or a time for the server to generate pose information for the at least one first frame, the frame render time is a time for the at least one first frame to be rendered at the server or a client device, the frame encode time may be a time for the at least one first frame to be encoded or compressed at the server, the frame encryption time may be a time for the at least one first frame to be encrypted at the server, the frame transmission time may be a time for the at least one first frame to be transmitted from the server to the client device, the frame decryption time may be a time for the at least one first frame to be decrypted at the client device, the frame decode time may be a time for the at least one first frame to be decoded at the client device, and the frame reprojection time is a time for the at least one first frame to be reprojected at the client device.

At 1208, the client device may detect a set of actual frame processing times for the at least one first frame in the set of frames, as described in connection with the examples in FIGS. 1-10. For example, as described in 1040 of FIG. 10, client device 1002 may detect a set of actual frame processing times for the at least one first frame in the set of frames. Further, step 1208 may be performed by display processor 127 in FIG. 1. In some aspects, detecting the set of actual frame processing times for the at least one first frame may comprise: detecting the set of actual frame processing times for the at least one first frame based on the target Vsync time. Also, detecting the set of actual frame processing times for the at least one first frame may comprise: calculating the set of actual frame processing times for the at least one first frame. Additionally, detecting the set of actual frame processing times for the at least one first frame comprises: obtaining an indication of the set of actual frame processing times for the at least one first frame. Further, obtaining the indication of the set of actual frame processing times for the at least one first frame comprises: receiving, from a client device or a server, the indication of the set of actual frame processing times for the at least one first frame In some aspects, the set of actual frame processing times for the at least one first frame may include one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame. Additionally, the pose time may be a time when a pose for the at least one first frame is available at a server or a time for the server to generate pose information for the at least one first frame, the frame render time is a time for the at least one first frame to be rendered at the server or a client device, the frame encode time may be a time for the at least one first frame to be encoded or compressed at the server, the frame encryption time may be a time for the at least one first frame to be encrypted at the server, the frame transmission time may be a time for the at least one first frame to be transmitted from the server to the client device, the frame decryption time may be a time for the at least one first frame to be decrypted at the client device, the frame decode time may be a time for the at least one first frame to be decoded at the client device, and the frame reprojection time is a time for the at least one first frame to be reprojected at the client device.

At 1210, the client device may output, based on the set of estimated frame processing times and the set of actual frame processing times, an indication to adjust a set of second frame processing times for at least one second frame in the set of frames, where the at least one second frame is subsequent to the at least one first frame in the set of frames, as described in connection with the examples in FIGS. 1-10. For example, as described in 1050 of FIG. 10, client device 1002 may output, based on the set of estimated frame processing times and the set of actual frame processing times, an indication to adjust a set of second frame processing times for at least one second frame in the set of frames, where the at least one second frame is subsequent to the at least one first frame in the set of frames. Further, step 1210 may be performed by display processor 127 in FIG. 1. In some aspects, outputting the indication to adjust the set of second frame processing times for the at least one second frame comprises: transmitting, to a client device or a server, the indication to adjust the set of second frame processing times for the at least one second frame (e.g., client device 1002 may transmit indication 1052 to server 1004). Also, outputting the indication to adjust the set of second frame processing times for the at least one second frame comprises: storing, in a memory or a cache, the indication to adjust the set of second frame processing times for the at least one second frame (e.g., client device 1002 may store indication 1054 in memory 1006).

At 1212, the client device may adjust, based on the set of estimated frame processing times and the set of actual frame processing times, the set of second frame processing times for the at least one second frame, as described in connection with the examples in FIGS. 1-10. For example, as described in 1060 of FIG. 10, client device 1002 may adjust, based on the set of estimated frame processing times and the set of actual frame processing times, the set of second frame processing times for the at least one second frame. Further, step 1212 may be performed by display processor 127 in FIG. 1. In some aspects, adjusting the set of second frame processing times for the at least one second frame may comprise: increasing the set of second frame processing times for the at least one second frame based on the set of actual frame processing times for the at least one first frame being less than the set of estimated frame processing times for the at least one first frame. Also, adjusting the set of second frame processing times for the at least one second frame may comprise: decreasing the set of second frame processing times for the at least one second frame based on the set of actual frame processing times for the at least one first frame being greater than the set of estimated frame processing times for the at least one first frame. Further, adjusting the set of second frame processing times for the at least one second frame may comprise: adjusting a workload associated with a central processing unit (CPU) or a graphics processing unit (GPU) for the at least one second frame. Moreover, adjusting the set of second frame processing times for the at least one second frame may comprise: adjusting, for the at least one second frame, a clock or a corner associated with at least one of: a central processing unit (CPU), a graphics processing unit (GPU), an encoder, a decoder, or a double data rate (DDR) memory. Also, adjusting the set of second frame processing times for the at least one second frame may comprise: adjusting a data rate or a modulation and coding scheme (MCS) rate for the at least one second frame. Further, adjusting the set of second frame processing times for the at least one second frame may comprise: adjusting, for the at least one second frame, at least one of: an encoding rate, a compression rate, a bitrate, or a group of pictures (GOP) rate. Moreover, adjusting the set of second frame processing times for the at least one second frame may comprise: adjusting a content resolution for the at least one second frame.

In configurations, a method or an apparatus for display processing is provided. The apparatus may be a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, and/or some other processor that may perform display processing. In aspects, the apparatus may be the display processor 127 within the device 104, or may be some other hardware within the device 104 or another device. The apparatus, e.g., display processor 127, may include means for estimating a set of frame processing times for at least one first frame in a set of frames. The apparatus, e.g., display processor 127, may also include means for detecting a set of actual frame processing times for the at least one first frame in the set of frames. The apparatus, e.g., display processor 127, may also include means for outputting, based on the set of estimated frame processing times and the set of actual frame processing times, an indication to adjust a set of second frame processing times for at least one second frame in the set of frames, where the at least one second frame is subsequent to the at least one first frame in the set of frames. The apparatus, e.g., display processor 127, may also include means for adjusting, based on the set of estimated frame processing times and the set of actual frame processing times, the set of second frame processing times for the at least one second frame. The apparatus, e.g., display processor 127, may also include means for obtaining an indication of the set of frames prior to the estimation of the set of frame processing times. The apparatus, e.g., display processor 127, may also include means for training a machine learning (ML) model for the set of frames prior to the estimation of the set of frame processing times.

The subject matter described herein may be implemented to realize one or more benefits or advantages. For instance, the described display processing techniques may be used by a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, or some other processor that may perform display processing to implement the dynamic performance and power adjustment techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize dynamic performance and power adjustment techniques in order to improve memory bandwidth efficiency and/or increase processing speed at a client device, a server, a GPU, a DPU and/or a CPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including at least one memory; and at least one processor coupled to the at least one memory and, based at least in part on information stored in the at least one memory, the at least one processor, individually or in any combination, is configured to: estimate a set of frame processing times for at least one first frame in a set of frames; detect a set of actual frame processing times for the at least one first frame in the set of frames; and output, based on the set of estimated frame processing times and the set of actual frame processing times, an indication to adjust a set of second frame processing times for at least one second frame in the set of frames, wherein the at least one second frame is subsequent to the at least one first frame in the set of frames.

Aspect 2 is the apparatus of aspect 1, wherein the at least one processor, individually or in any combination, is further configured to: adjust, based on the set of estimated frame processing times and the set of actual frame processing times, the set of second frame processing times for the at least one second frame.

Aspect 3 is the apparatus of aspect 2, wherein to adjust the set of second frame processing times for the at least one second frame, the at least one processor, individually or in any combination, is configured to: increase the set of second frame processing times for the at least one second frame based on the set of actual frame processing times for the at least one first frame being less than the set of estimated frame processing times for the at least one first frame.

Aspect 4 is the apparatus of aspect 2, wherein to adjust the set of second frame processing times for the at least one second frame, the at least one processor, individually or in any combination, is configured to: decrease the set of second frame processing times for the at least one second frame based on the set of actual frame processing times for the at least one first frame being greater than the set of estimated frame processing times for the at least one first frame.

Aspect 5 is the apparatus of any of aspects 2 to 4, wherein to adjust the set of second frame processing times for the at least one second frame, the at least one processor, individually or in any combination, is configured to: adjust a workload associated with a central processing unit (CPU) or a graphics processing unit (GPU) for the at least one second frame.

Aspect 6 is the apparatus of any of aspects 2 to 5, wherein to adjust the set of second frame processing times for the at least one second frame, the at least one processor, individually or in any combination, is configured to: adjust, for the at least one second frame, a clock or a corner associated with at least one of: a central processing unit (CPU), a graphics processing unit (GPU), an encoder, a decoder, or a double data rate (DDR) memory.

Aspect 7 is the apparatus of any of aspects 2 to 6, wherein to adjust the set of second frame processing times for the at least one second frame, the at least one processor, individually or in any combination, is configured to: adjust a data rate or a modulation and coding scheme (MCS) rate for the at least one second frame.

Aspect 8 is the apparatus of any of aspects 2 to 7, wherein to adjust the set of second frame processing times for the at least one second frame, the at least one processor, individually or in any combination, is configured to: adjust, for the at least one second frame, at least one of: an encoding rate, a compression rate, a bitrate, or a group of pictures (GOP) rate.

Aspect 9 is the apparatus of any of aspects 2 to 8, wherein to adjust the set of second frame processing times for the at least one second frame, the at least one processor, individually or in any combination, is configured to: adjust a content resolution for the at least one second frame.

Aspect 10 is the apparatus of any of aspects 1 to 9, wherein at least one of the set of estimated frame processing times or the set of actual frame processing times for the at least one first frame includes one or more of: a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame.

Aspect 11 is the apparatus of aspect 10, wherein the pose time is a time when a pose for the at least one first frame is available at a server or a time for the server to generate pose information for the at least one first frame, wherein the frame render time is a time for the at least one first frame to be rendered at the server or a client device, wherein the frame encode time is a time for the at least one first frame to be encoded or compressed at the server, wherein the frame encryption time is a time for the at least one first frame to be encrypted at the server, wherein the frame transmission time is a time for the at least one first frame to be transmitted from the server to the client device, wherein the frame decryption time is a time for the at least one first frame to be decrypted at the client device, wherein the frame decode time is a time for the at least one first frame to be decoded at the client device, and wherein the frame reprojection time is a time for the at least one first frame to be reprojected at the client device.

Aspect 12 is the apparatus of any of aspects 1 to 11, wherein to estimate the set of frame processing times for the at least one first frame, the at least one processor, individually or in any combination, is configured to: estimate the set of frame processing times for the at least one first frame based on a target vertical synchronization (Vsync) time; and wherein to detect the set of actual frame processing times for the at least one first frame, the at least one processor, individually or in any combination, is configured to: detect the set of actual frame processing times for the at least one first frame based on the target Vsync time.

Aspect 13 is the apparatus of any of aspects 1 to 12, wherein to estimate the set of frame processing times for the at least one first frame, the at least one processor, individually or in any combination, is configured to: estimate the set of frame processing times for the at least one first frame based on at least one of: a machine learning (ML) model, an artificial intelligence (AI) model, or a statistical model.

Aspect 14 is the apparatus of any of aspects 1 to 13, wherein to detect the set of actual frame processing times for the at least one first frame, the at least one processor, individually or in any combination, is configured to: calculate the set of actual frame processing times for the at least one first frame.

Aspect 15 is the apparatus of any of aspects 1 to 14, wherein to detect the set of actual frame processing times for the at least one first frame, the at least one processor, individually or in any combination, is configured to: obtain an indication of the set of actual frame processing times for the at least one first frame.

Aspect 16 is the apparatus of aspect 15, further comprising at least one of an antenna or a transceiver coupled to the at least one processor, wherein to obtain the indication of the set of actual frame processing times for the at least one first frame, the at least one processor, individually or in any combination, is configured to: receive, from a client device or a server via at least one of the antenna or the transceiver, the indication of the set of actual frame processing times for the at least one first frame.

Aspect 17 is the apparatus of any of aspects 1 to 16, wherein the at least one processor, individually or in any combination, is further configured to: obtain an indication of the set of frames prior to the estimation of the set of frame processing times, wherein to estimate the set of frame processing times for the at least one first frame, the at least one processor, individually or in any combination, is configured to: estimate the set of frame processing times for the at least one first frame based on the indication of the set of frames.

Aspect 18 is the apparatus of any of aspects 1 to 17, wherein the at least one processor, individually or in any combination, is further configured to: train a machine learning (ML) model for the set of frames prior to the estimation of the set of frame processing times, wherein to estimate the set of frame processing times for the at least one first frame, the at least one processor, individually or in any combination, is configured to: estimate the set of frame processing times for the at least one first frame based on the ML model.

Aspect 19 is the apparatus of any of aspects 1 to 18, wherein to output the indication to adjust the set of second frame processing times for the at least one second frame, the at least one processor, individually or in any combination, is configured to: transmit, to a client device or a server, the indication to adjust the set of second frame processing times for the at least one second frame.

Aspect 20 is the apparatus of any of aspects 1 to 19, wherein to output the indication to adjust the set of second frame processing times for the at least one second frame, the at least one processor, individually or in any combination, is configured to: store, in a memory or a cache, the indication to adjust the set of second frame processing times for the at least one second frame.

Aspect 21 is a method of display processing for implementing any of aspects 1 to 20.

Aspect 22 is an apparatus for display processing including means for implementing any of aspects 1 to 20.

Aspect 23 is a computer-readable medium (e.g., a non-transitory computer-readable medium) storing computer executable code, the code when executed by at least one processor causes the at least one processor to implement any of aspects 1 to 20.

What is claimed is:

1. An apparatus for frame processing, comprising:
at least one memory; and
at least one processor coupled to the at least one memory and, based at least in part on information stored in the at least one memory, the at least one processor is configured to:
   estimate a set of frame processing times for at least one first frame in a set of frames based on at least one of a machine learning (ML) model, an artificial intelligence (AI) model, or a statistical model;
   detect a set of actual frame processing times for the at least one first frame in the set of frames;
   output, based on the set of estimated frame processing times and the set of actual frame processing times, an indication to adjust a set of second frame processing times for at least one second frame in the set of frames, wherein the at least one second frame is subsequent to the at least one first frame in the set of frames; and
   adjust, based on the set of estimated frame processing times and the set of actual frame processing times, the set of second frame processing times for the at least one second frame, wherein adjustment of the set of second frame processing times for the at least one second frame is associated with adjustment of a content resolution for the at least one second frame.

2. The apparatus of claim 1, wherein to adjust the set of second frame processing times for the at least one second frame, the at least one processor is configured to:

increase the set of second frame processing times for the at least one second frame based on the set of actual frame processing times for the at least one first frame being less than the set of estimated frame processing times for the at least one first frame.

3. The apparatus of claim 1, wherein to adjust the set of second frame processing times for the at least one second frame, the at least one processor is configured to:

decrease the set of second frame processing times for the at least one second frame based on the set of actual frame processing times for the at least one first frame being greater than the set of estimated frame processing times for the at least one first frame.

4. The apparatus of claim 1, wherein to adjust the set of second frame processing times for the at least one second frame, the at least one processor is configured to:

adjust a workload associated with a central processing unit (CPU) or a graphics processing unit (GPU) for the at least one second frame.

5. The apparatus of claim 1, wherein to adjust the set of second frame processing times for the at least one second frame, the at least one processor is configured to:

adjust, for the at least one second frame, a clock or a corner associated with at least one of: a central processing unit (CPU), a graphics processing unit (GPU), an encoder, a decoder, or a double data rate (DDR) memory.

6. The apparatus of claim 1, wherein to adjust the set of second frame processing times for the at least one second frame, the at least one processor is configured to:

adjust a data rate or a modulation and coding scheme (MCS) rate for the at least one second frame.

7. The apparatus of claim 1, wherein to adjust the set of second frame processing times for the at least one second frame, the at least one processor is configured to:

adjust, for the at least one second frame, at least one of: an encoding rate, a compression rate, a bitrate, or a group of pictures (GOP) rate.

8. The apparatus of claim 1, wherein to adjust the set of second frame processing times for the at least one second frame, the at least one processor is configured to:

adjust the content resolution for the at least one second frame.

9. The apparatus of claim 1, wherein at least one of the set of estimated frame processing times or the set of actual frame processing times for the at least one first frame includes one or more of:

a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame.

10. The apparatus of claim 9, wherein the pose time is a time when a pose for the at least one first frame is available at a server or a time for the server to generate pose information for the at least one first frame, wherein the frame render time is a time for the at least one first frame to be rendered at the server or a client device, wherein the frame encode time is a time for the at least one first frame to be encoded or compressed at the server, wherein the frame encryption time is a time for the at least one first frame to be encrypted at the server, wherein the frame transmission time is a time for the at least one first frame to be transmitted from the server to the client device, wherein the frame decryption time is a time for the at least one first frame to be decrypted at the client device, wherein the frame decode time is a time for the at least one first frame to be decoded at the client device, and wherein the frame reprojection time is a time for the at least one first frame to be reprojected at the client device.

11. The apparatus of claim 1, wherein to estimate the set of frame processing times for the at least one first frame, the at least one processor is configured to: estimate the set of frame processing times for the at least one first frame based on a target vertical synchronization (Vsync) time; and wherein to detect the set of actual frame processing times for the at least one first frame, the at least one processor is configured to: detect the set of actual frame processing times for the at least one first frame based on the target Vsync time.

12. The apparatus of claim 1, wherein to detect the set of actual frame processing times for the at least one first frame, the at least one processor is configured to:

calculate the set of actual frame processing times for the at least one first frame.

13. The apparatus of claim 1, wherein to detect the set of actual frame processing times for the at least one first frame, the at least one processor is configured to:

obtain an indication of the set of actual frame processing times for the at least one first frame.

14. The apparatus of claim 13, further comprising at least one of an antenna or a transceiver coupled to the at least one processor, wherein to obtain the indication of the set of actual frame processing times for the at least one first frame, the at least one processor is configured to:

receive, from a client device or a server via at least one of the antenna or the transceiver, the indication of the set of actual frame processing times for the at least one first frame.

15. The apparatus of claim 1, wherein the at least one processor is further configured to:

obtain an indication of the set of frames prior to the estimation of the set of frame processing times, wherein to estimate the set of frame processing times for the at least one first frame, the at least one processor is configured to: estimate the set of frame processing times for the at least one first frame based on the indication of the set of frames.

16. The apparatus of claim 1, wherein the at least one processor is further configured to:

train the ML model for the set of frames prior to the estimation of the set of frame processing times, wherein to estimate the set of frame processing times for the at least one first frame, the at least one processor is configured to: estimate the set of frame processing times for the at least one first frame based on the ML model.

17. The apparatus of claim 1, wherein to output the indication to adjust the set of second frame processing times for the at least one second frame, the at least one processor is configured to:

transmit, to a client device or a server, the indication to adjust the set of second frame processing times for the at least one second frame.

18. The apparatus of claim 1, wherein to output the indication to adjust the set of second frame processing times for the at least one second frame, the at least one processor is configured to:

store, in a memory or a cache, the indication to adjust the set of second frame processing times for the at least one second frame.

19. A method of frame processing, comprising:

estimating a set of frame processing times for at least one first frame in a set of frames based on at least one of a machine learning (ML) model, an artificial intelligence (AI) model, or a statistical model;

detecting a set of actual frame processing times for the at least one first frame in the set of frames;

outputting, based on the set of estimated frame processing times and the set of actual frame processing times, an indication to adjust a set of second frame processing times for at least one second frame in the set of frames, wherein the at least one second frame is subsequent to the at least one first frame in the set of frames; and adjusting, based on the set of estimated frame processing times and the set of actual frame processing times, the set of second frame processing times for the at least one second frame, wherein adjustment of the set of second frame processing times for the at least one second frame is associated with adjustment of a content resolution for the at least one second frame.

20. The method of claim 19, wherein adjusting the set of second frame processing times for the at least one second frame comprises at least one of:

increasing the set of second frame processing times for the at least one second frame based on the set of actual frame processing times for the at least one first frame being less than the set of estimated frame processing times for the at least one first frame;

decreasing the set of second frame processing times for the at least one second frame based on the set of actual frame processing times for the at least one first frame being greater than the set of estimated frame processing times for the at least one first frame;

adjusting a workload associated with a central processing unit (CPU) or a graphics processing unit (GPU) for the at least one second frame;

adjusting, for the at least one second frame, a clock or a corner associated with at least one of: the CPU, the GPU, an encoder, a decoder, or a double data rate (DDR) memory;

adjusting a data rate or a modulation and coding scheme (MCS) rate for the at least one second frame;

adjusting, for the at least one second frame, at least one of: an encoding rate, a compression rate, a bitrate, or a group of pictures (GOP) rate; or adjusting the content resolution for the at least one second frame.

21. The method of claim 19, wherein at least one of the set of estimated frame processing times or the set of actual frame processing times for the at least one first frame includes one or more of:

a pose time for the at least one first frame, a frame render time for the at least one first frame, a frame encode time for the at least one first frame, a frame encryption time for the at least one first frame, a frame transmission time for the at least one first frame, a frame decryption time for the at least one first frame, a frame decode time for the at least one first frame, or a frame reprojection time for the at least one first frame, wherein the pose time is a time when a pose for the at least one first frame is available at a server or a time for the server to generate pose information for the at least one first frame, wherein the frame render time is a time for the at least one first frame to be rendered at the server or a client device, wherein the frame encode time is a time for the at least one first frame to be encoded or compressed at the server, wherein the frame encryption time is a time for the at least one first frame to be encrypted at the server, wherein the frame transmission time is a time for the at least one first frame to be transmitted from the server to the client device, wherein the frame decryption time is a time for the at least one first frame to be decrypted at the client device, wherein the frame decode time is a time for the at least one first frame to be decoded at the client device, and wherein the frame reprojection time is a time for the at least one first frame to be reprojected at the client device.

22. The method of claim 19, wherein estimating the set of frame processing times for the at least one first frame comprises: estimating the set of frame processing times for the at least one first frame based on a target vertical synchronization (Vsync) time; and wherein detecting the set of actual frame processing times for the at least one first frame comprises: detecting the set of actual frame processing times for the at least one first frame based on the target Vsync time.

23. The method of claim 19, wherein detecting the set of actual frame processing times for the at least one first frame comprises: calculating the set of actual frame processing times for the at least one first frame, or obtaining an indication of the set of actual frame processing times for the at least one first frame.

24. The method of claim 19, further comprising:

obtaining an indication of the set of frames prior to the estimation of the set of frame processing times, wherein estimating the set of frame processing times for the at least one first frame comprises: estimating the set of frame processing times for the at least one first frame based on the indication of the set of frames.

25. The method of claim 19, further comprising:

training the ML model for the set of frames prior to the estimation of the set of frame processing times, wherein estimating the set of frame processing times for the at least one first frame comprises: estimating the set of frame processing times for the at least one first frame based on the ML model.

26. An apparatus for frame processing, comprising:

means for estimating a set of frame processing times for at least one first frame in a set of frames based on at least one of a machine learning (ML) model, an artificial intelligence (AI) model, or a statistical model;

means for detecting a set of actual frame processing times for the at least one first frame in the set of frames;

means for outputting, based on the set of estimated frame processing times and the set of actual frame processing times, an indication to adjust a set of second frame processing times for at least one second frame in the set of frames, wherein the at least one second frame is subsequent to the at least one first frame in the set of frames; and means for adjusting, based on the set of estimated frame processing times and the set of actual frame processing times, the set of second frame processing times for the at least one second frame, wherein adjustment of the set of second frame processing times for the at least one second frame is associated with adjustment of a content resolution for the at least one second frame.

27. A non-transitory computer-readable medium storing computer executable code for display processing, the code when executed by at least one processor causes the at least one processor to:

estimate a set of frame processing times for at least one first frame in a set of frames based on at least one of a machine learning (ML) model, an artificial intelligence (AI) model, or a statistical model;

detect a set of actual frame processing times for the at least one first frame in the set of frames;

output, based on the set of estimated frame processing times and the set of actual frame processing times, an indication to adjust a set of second frame processing times for at least one second frame in the set of frames, wherein the at least one second frame is subsequent to the at least one first frame in the set of frames; and adjust, based on the set of estimated frame processing times and the set of actual frame processing times, the set of second frame processing times for the at least one second frame, wherein adjustment of the set of second frame processing times for the at least one second frame is associated with adjustment of a content resolution for the at least one second frame.

\* \* \* \* \*